United States Patent
Hannuksela

(10) Patent No.: US 9,852,219 B2
(45) Date of Patent: Dec. 26, 2017

(54) SEGMENTED METADATA AND INDEXES FOR STREAMED MULTIMEDIA DATA

(75) Inventor: Miska M. Hannuksela, Ruutana (FI)

(73) Assignee: Nokia Technologies Oy, Espoo (FI)

( * ) Notice: Subject to any disclaimer, the term of this patent is extended or adjusted under 35 U.S.C. 154(b) by 100 days.

(21) Appl. No.: 12/194,496

(22) Filed: Aug. 19, 2008

(65) Prior Publication Data

US 2009/0055417 A1 Feb. 26, 2009

Related U.S. Application Data

(60) Provisional application No. 60/956,912, filed on Aug. 20, 2007, provisional application No. 60/971,193, (Continued)

(51) Int. Cl.
*G06F 7/00* (2006.01)
*G06F 17/30* (2006.01)
*H04N 21/854* (2011.01)

(52) U.S. Cl.
CPC .. *G06F 17/30858* (2013.01); *G06F 17/30023* (2013.01); *G06F 17/30038* (2013.01); (Continued)

(58) Field of Classification Search
CPC ........... G06F 17/30858; G06F 17/3082; G06F 17/30817; G06F 17/30038;
(Continued)

(56) References Cited

U.S. PATENT DOCUMENTS 7,110,664 B2 * 9/2006 Yogeshwar et al. .......... 386/328
7,155,531 B1 * 12/2006 Lango et al. ................. 709/231
(Continued)

FOREIGN PATENT DOCUMENTS

CN 1578311 A 2/2005
CN 1650628 8/2005
(Continued)

OTHER PUBLICATIONS

International Search Report for PCT Application No. PCT/IB2008/053321 dated Jan. 12, 2009.
(Continued)

*Primary Examiner* — Mohammed R Uddin
(74) *Attorney, Agent, or Firm* — Alston & Bird LLP

(57) ABSTRACT

A method of organizing streamed data includes storing streamed data in a file, identifying metadata applicable to a subset of the streamed data, and forming at least one group of one or more samples of the streamed data, each sample in a group having identical metadata content for a metadata type. The file may be in accordance with ISO base media file format. The storing streamed data in a file may include storing in a reception hint track. The at least one group may be indicated in a sample group description box. The metadata type may be indicated by a grouping type and grouping instance data, the grouping type specifying semantics of the grouping instance data and the metadata content. The metadata content may comprise a metadata payload and zero or more metadata payload extensions, where the metadata payload is included in a first structure and the zero or more metadata payload extensions are included in a second structure.

51 Claims, 11 Drawing Sheets

Related U.S. Application Data filed on Sep. 10, 2007, provisional application No. 60/992,057, filed on Dec. 3, 2007.

(52) U.S. Cl.
CPC .... *G06F 17/30044* (2013.01); *G06F 17/3082* (2013.01); *G06F 17/30817* (2013.01); *G06F 17/30997* (2013.01); *H04N 21/85406* (2013.01)

(58) Field of Classification Search
CPC ......... G06F 17/30023; G06F 17/30044; G06F 17/30997; H04N 21/85406
USPC .................. 707/802, 999.107, 693, 700, 754
See application file for complete search history.

(56) References Cited

U.S. PATENT DOCUMENTS

| | | | |
|---|---|---|---|
| 7,483,532 | B2 | 1/2009 | Alkove et al. |
| 2002/0009172 | A1* | 1/2002 | Cornog et al. ............... 375/377 |
| 2003/0061369 | A1* | 3/2003 | Aksu et al. .................. 709/231 |
| 2003/0110503 | A1 | 6/2003 | Perkes |
| 2004/0167925 | A1* | 8/2004 | Visharam et al. ......... 707/104.1 |
| 2005/0002525 | A1* | 1/2005 | Alkove et al. ................ 380/37 |
| 2005/0102371 | A1 | 5/2005 | Aksu |
| 2007/0016594 | A1* | 1/2007 | Visharam et al. ........... 707/100 |
| 2007/0186005 | A1 | 8/2007 | Setlur et al. |
| 2008/0256326 | A1* | 10/2008 | Patterson et al. ............ 711/206 |
| 2009/0282077 | A1* | 11/2009 | Thomas .................... 707/104.1 |
| 2010/0114848 | A1* | 5/2010 | McKelvie et al. ........... 707/704 |
| 2010/0198887 | A1* | 8/2010 | Visharam et al. ........... 707/825 |

FOREIGN PATENT DOCUMENTS

| | | |
|---|---|---|
| CN | 1650628 A | 8/2005 |
| DE | 10392281 T5 | 5/2005 |
| EP | 1 500 002 A1 | 1/2005 |
| KR | 2004008541 | 10/2004 |
| WO | WO 03073768 | 9/2003 |
| WO | WO-03073768 | 9/2003 |
| WO | WO 03/098475 A1 | 11/2003 |
| WO | WO 2007080500 | 7/2007 |

OTHER PUBLICATIONS

Office Action for Russian Patent Application No. 2010111391/08(016054), dated Jun. 28, 2011.

English translation of Office Action for Russian Patent Application No. 2010111391/08(016054), dated Jun. 28, 2011.

Office Action for Korean Patent Application No. 2010-7006107, dated Apr. 7, 2011.

English translation for Office Action for Korean Patent Application No. 2010-7006107, dated Apr. 7, 2011.

Office Action for Chinese Patent Application No. 200880107466.4, dated Sep. 22, 2011.

English translation of Office Action for Chinese Patent Application No. 200880107466.4, dated Sep. 22, 2011.

Chinese Patent Office for Patent Application No. 200880107466.4, dated Aug. 30, 2012.

State Intellectual Property Office of the People's Republic of China, Third Office Action for CN Application No. 200880107466.4, dated Apr. 25, 2013, 10 pages, China.

Examiner's communication in connection with Canadian Patent Application No. 2,695,645, dated Apr. 12, 2012.

Office Action for Canadian Application No. 2,695,645 dated Dec. 16, 2013.

Supplementary European Search Report for Application No. EP 08 80 7361 dated Apr. 22, 2014.

Office Action for corresponding Canadian Application No. 2,695,645 dated Nov. 10, 2015.

Written Opinion from International Application No. PCT/IB2008/053321 dated Jan. 12, 2009.

Examination Report from Indian Patent Application No. 1558/CHENP/2010 dated Dec. 20, 2016.

\* cited by examiner

SEGMENTED METADATA AND INDEXES FOR STREAMED MULTIMEDIA DATA

CROSS-REFERENCE TO RELATED APPLICATIONS

The present application claims priority to U.S. Provisional Application No. 60/992,057, filed Dec. 3, 2007, U.S. Provisional Application No. 60/971,193, filed Sep. 10, 2008, and U.S. Provisional Application No. 60/956,912, filed Aug. 20, 2007 all of which are incorporated herein by reference.

FIELD OF THE INVENTION

The present invention relates generally to the field of streamed multimedia data and, more specifically, to the organization of such multimedia data with metadata and/or indexes.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The multimedia container file format is an important element in the chain of multimedia content production, manipulation, transmission and consumption. There are substantial differences between the coding format (a.k.a. elementary stream format) and the container file format. The coding format relates to the action of a specific coding algorithm that codes the content information into a bitstream. The container file format comprises means of organizing the generated bitstream in such way that it can be accessed for local decoding and playback, transferred as a file, or streamed, all utilizing a variety of storage and transport architectures. Furthermore, the file format can facilitate interchange and editing of the media as well as recording of received real-time streams to a file.

Available media file format standards include ISO base media file format (ISO/IEC 14496-12), MPEG-4 file format (ISO/IEC 14496-14, also known as the MP4 format), AVC file format (ISO/IEC 14496-15) and 3GPP file format (3GPP TS 26.244, also known as the 3GP format). Other formats are also currently in development.

It is desirable that such media file formats enable the use of metadata. In many applications, such as reception and storage of media streams, such as audio and video streams, it is desirable that the file format enable the use of metadata that is specific to segments of the content of the streamed data to facilitate organization and access to desired sections or segments of the streamed data.

SUMMARY OF THE INVENTION

One aspect of the invention relates to a method of organizing streamed data. The method includes storing streamed data in a file, identifying metadata applicable to a subset of the streamed data, and forming at least one group of one or more samples of the streamed data, each sample in a group having identical metadata content for a metadata type.

In one embodiment, the at least one group is identified in a file.

In one embodiment, the file is in accordance with ISO base media file format. The storing streamed data in a file may include storing in a reception hint track. The at least one group may be indicated in a sample group description box.

In one embodiment, the metadata type includes titles of segments of the streamed data.

In one embodiment, a group includes samples from two or more tracks. The method may further comprise identifying the group including samples from two or more tracks with metadata associated with all related tracks. Alternatively, the method may comprise identifying the group including samples from two or more tracks with metadata associated with a master track.

In one embodiment, the method further includes creating a timed metadata track for the streamed data. In one embodiment, the at least one group of one or more samples of the streamed data is indicated in a sample group description box for the timed metadata track through associating the at least one group of one or more samples of the streamed data with respective timed metadata samples in the timed metadata track.

In one embodiment, the timed metadata track associates timing metadata with one or more timelines. The timed metadata track may associate timing metadata with two or more timelines.

In another aspect, the invention relates to a computer program embodied on a computer-readable medium. The computer program is configured to provide a method comprising storing streamed data in a file, identifying metadata applicable to a subset of the streamed data, and forming at least one group of one or more samples of the streamed data, each sample in a group having identical metadata content for a metadata type.

In another aspect of the invention, a receiver adapted to receive streamed data includes a storage unit for storing streamed data in a file, and a processor. The processor is adapted to identify metadata applicable to a subset of the streamed data and form at least one group of one or more samples of the streamed data, each sample in a group having identical metadata content for a metadata type.

In various embodiments, the metadata type may be indicated by a grouping type and grouping instance data, the grouping type specifying semantics of the grouping instance data and the metadata content. The metadata content may comprise a metadata payload and zero or more metadata payload extensions, where the metadata payload is included in a first structure and the zero or more metadata payload extensions are included in a second structure.

These and other advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF VARIOUS EMBODIMENTS

Figure 1:
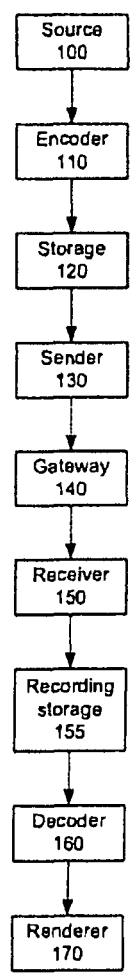
FIG. 1 illustrates a graphical representation of an exemplary multimedia communication system within which embodiments of the present invention may be implemented.

FIG. 1 is a graphical representation of a generic multimedia communication system within which various embodiments of the present invention may be implemented. As shown in FIG. 1, a data source 100 provides a source signal in an analog, uncompressed digital, or compressed digital format, or any combination of these formats. An encoder 110 encodes the source signal into a coded media bitstream. It should be noted that a bitstream to be decoded can be received directly or indirectly from a remote device located within virtually any type of network. Additionally, the bitstream can be received from local hardware or software. The encoder 110 may be capable of encoding more than one media type, such as audio and video, or more than one encoder 110 may be required to code different media types of the source signal. The encoder 110 may also get synthetically produced input, such as graphics and text, or it may be capable of producing coded bitstreams of synthetic media. In the following, only processing of one coded media bitstream of one media type is considered to simplify the description. It should be noted, however, that typically real-time broadcast services comprise several streams (typically at least one audio, video and text sub-titling stream). It should also be noted that the system may include many encoders, but in FIG. 1 only one encoder 110 is represented to simplify the description without a lack of generality. It should be further understood that, although text and examples contained herein may specifically describe an encoding process, one skilled in the art would understand that the same concepts and principles also apply to the corresponding decoding process and vice versa.

The coded media bitstream is transferred to a storage 120. The storage 120 may comprise any type of mass memory to store the coded media bitstream. The format of the coded media bitstream in the storage 120 may be an elementary self-contained bitstream format, or one or more coded media bitstreams may be encapsulated into a container file. Some systems operate "live", i.e. omit storage and transfer coded media bitstream from the encoder 110 directly to the sender 130. The coded media bitstream is then transferred to the sender 130, also referred to as the server, on a need basis. The format used in the transmission may be an elementary self-contained bitstream format, a packet stream format, or one or more coded media bitstreams may be encapsulated into a container file. The encoder 110, the storage 120, and the server 130 may reside in the same physical device or they may be included in separate devices. The encoder 110 and server 130 may operate with live real-time content, in which case the coded media bitstream is typically not stored permanently, but rather buffered for small periods of time in the content encoder 110 and/or in the server 130 to smooth out variations in processing delay, transfer delay, and coded media bitrate.

The server 130 sends the coded media bitstream using a communication protocol stack. The stack may include but is not limited to Real-Time Transport Protocol (RTP), User Datagram Protocol (UDP), and Internet Protocol (IP). When the communication protocol stack is packet-oriented, the server 130 encapsulates the coded media bitstream into packets. For example, when RTP is used, the server 130 encapsulates the coded media bitstream into RTP packets according to an RTP payload format. Typically, each media type has a dedicated RTP payload format. It should be again noted that a system may contain more than one server 130, but for the sake of simplicity, the following description only considers one server 130.

The server 130 may or may not be connected to a gateway 140 through a communication network. The gateway 140 may perform different types of functions, such as translation of a packet stream according to one communication protocol stack to another communication protocol stack, merging and forking of data streams, and manipulation of data stream according to the downlink and/or receiver capabilities, such as controlling the bit rate of the forwarded stream according to prevailing downlink network conditions. Examples of gateways 140 include multipoint conference control units (MCUs), gateways between circuit-switched and packet-switched video telephony, Push-to-talk over Cellular (PoC) servers, IP encapsulators in digital video broadcasting-handheld (DVB-H) systems, or set-top boxes that forward broadcast transmissions locally to home wireless networks. When RTP is used, the gateway 140 is called an RTP mixer or an RTP translator and typically acts as an endpoint of an RTP connection.

The system includes one or more receivers 150, typically capable of receiving, de-modulating, and de-capsulating the transmitted signal into a coded media bitstream. The coded media bitstream is transferred to a recording storage 155. The recording storage 155 may comprise any type of mass memory to store the coded media bitstream. The recording storage 155 may alternatively or additively comprise computation memory, such as random access memory. The format of the coded media bitstream in the recording storage 155 may be an elementary self-contained bitstream format, or one or more coded media bitstreams may be encapsulated into a container file. If there are many coded media bitstreams, such as an audio stream and a video stream, associated with each other, a container file is typically used and the receiver 150 comprises or is attached to a container file generator producing a container file from input streams. Some systems operate "live," i.e. omit the recording storage 155 and transfer coded media bitstream from the receiver 150 directly to the decoder 160. In some systems, only the most recent part of the recorded stream, e.g., the most recent 10-minute excerption of the recorded stream, is maintained in the recording storage 155, while any earlier recorded data is discarded from the recording storage 155.

The coded media bitstream is transferred from the recording storage 155 to the decoder 160. If there are many coded media bitstreams, such as an audio stream and a video stream, associated with each other and encapsulated into a container file, a file parser (not shown in FIG. 1) is used to decapsulate each coded media bitstream from the container file. The recording storage 155 or a decoder 160 may comprise the file parser, or the file parser is attached to either recording storage 155 or the decoder 160.

The codec media bitstream is typically processed further by a decoder 160, whose output is one or more uncompressed media streams. Finally, a renderer 170 may reproduce the uncompressed media streams with a loudspeaker or a display, for example. The receiver 150, recording storage 155, decoder 160, and renderer 170 may reside in the same physical device or they may be included in separate devices.

The Digital Video Broadcasting (DVB) organization is currently in the process of specifying the DVB File Format. The primary purpose of defining the DVB File Format is to ease content interoperability between implementations of DVB technologies, such as set-top boxes according to current (DVT-T, DVB-C, DVB-S) and future DVB standards, IP (Internet Protocol) television receivers, and mobile television receivers according to DVB-H and its future evolutions. The DVB File Format will allow exchange of recorded (read-only) media between devices from different manufacturers, exchange of content using USB mass memories or similar read/write devices, and shared access to common disk storage on a home network, as well as much other functionality.

The ISO file format is the basis for most current multimedia container file formats, generally referred to as the ISO family of file formats. The ISO base media file format may be the basis for the development of the DVB File Format as well.

Figure 2:
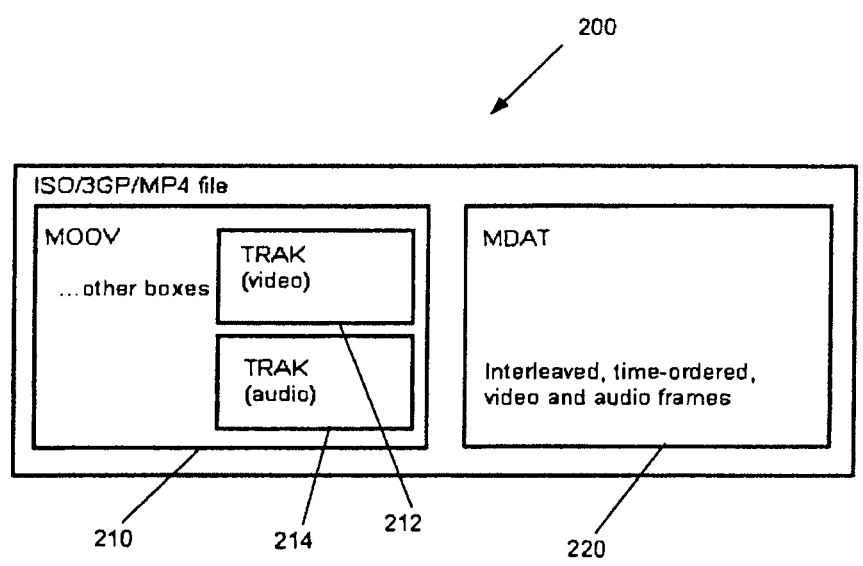
FIG. 2 illustrates an exemplary box in accordance with the ISO base media file format.

Referring now to FIG. 2, a simplified structure of the basic building block 200 in the ISO base media file format, generally referred to as a "box", is illustrated. Each box 200 has a header and a payload. The box header indicates the type of the box and the size of the box in terms of bytes. Many of the specified boxes are derived from the "full box" (FullBox) structure, which includes a version number and flags in the header. A box may enclose other boxes, such as boxes 210, 220, described below in further detail. The ISO file format specifies which box types are allowed within a box of a certain type. Furthermore, some boxes are mandatory to be present in each file, while others are optional. Moreover, for some box types, more than one box may be present in a file. In this regard, the ISO base media file format specifies a hierarchical structure of boxes.

According to ISO family of file formats, a file consists of media data and metadata that are enclosed in separate boxes, the media data (mdat) box 220 and the movie (moov) box 210, respectively. The movie box may contain one or more tracks, and each track resides in one track box 212, 214. A track can be one of the following types: media, hint or timed metadata. A media track refers to samples formatted according to a media compression format (and its encapsulation to the ISO base media file format). A hint track refers to hint samples, containing cookbook instructions for constructing packets for transmission over an indicated communication protocol. The cookbook instructions may contain guidance for packet header construction and include packet payload construction. In the packet payload construction, data residing in other tracks or items may be referenced (e.g., a reference may indicate which piece of data in a particular track or item is instructed to be copied into a packet during the packet construction process). A timed metadata track refers to samples describing referred media and/or hint samples. For the presentation one media type, typically one media track is selected.

ISO base media file format does not limit a presentation to be contained in one file, and it may be contained in several files. One file contains the metadata for the whole presentation. This file may also contain all the media data, whereupon the presentation is self-contained. The other files, if used, are not required to be formatted to ISO base media file format, are used to contain media data, and may also contain unused media data, or other information. The ISO base media file format concerns the structure of the presentation file only. The format of the media-data files is constrained the ISO base media file format or its derivative formats only in that the media-data in the media files must be formatted as specified in the ISO base media file format or its derivative formats.

Movie fragments can be used when recording content to ISO files in order to avoid losing data if a recording application crashes, runs out of disk, or some other incident happens. Without movie fragments, data loss may occur because the file format insists that all metadata (the Movie Box) be written in one contiguous area of the file. Furthermore, when recording a file, there may not be sufficient amount of RAM to buffer a Movie Box for the size of the storage available, and re-computing the contents of a Movie Box when the movie is closed is too slow. Moreover, movie fragments can enable simultaneous recording and playback of a file using a regular ISO file parser. Finally, smaller duration of initial buffering is required for progressive downloading (e.g., simultaneous reception and playback of a file, when movie fragments are used and the initial Movie Box is smaller compared to a file with the same media content but structured without movie fragments).

The movie fragment feature enables splitting of the metadata that conventionally would reside in the moov box 210 to multiple pieces, each corresponding to a certain period of time for a track. Thus, the movie fragment feature enables interleaving of file metadata and media data. Consequently, the size of the moov box 210 can be limited and the use cases mentioned above be realized.

The media samples for the movie fragments reside in an mdat box 220, as usual, if they are in the same file as the moov box. For the meta data of the movie fragments, however, a moof box is provided. It comprises the information for a certain duration of playback time that would previously have been in the moov box 210. The moov box 210 still represents a valid movie on its own, but in addition, it comprises an mvex box indicating that movie fragments will follow in the same file. The movie fragments extend the presentation that is associated to the moov box in time.

The metadata that can be included in the moof box is limited to a subset of the metadata that can be included in a moov box 210 and is coded differently in some cases. Details of the boxes that can be included in a moof box can be found from the ISO base media file format specifications ISO/IEC International Standard 14496-12, Second Edition, 2005-04-01, including Amendments 1 and 2, incorporated herein by reference in their entirety.

In addition to timed tracks, ISO files can contain any non-timed binary objects in a meta box, or "static" metadata. The meta box can reside at the top level of the file, within a movie box, and within a track box. At most one meta box may occur at each of the file level, movie level, or track level. The meta box is required to contain a 'hdlr' box indicating the structure or format of the "meta" box contents. The meta box may contain any number of binary items that can be referred and each one of them can be associated with a file name.

In order to support more than one meta box at any level of the hierarchy (file, movie, or track), a meta box container box ('meco') has been introduced in the ISO base media file format. The meta box container box can carry any number of additional meta boxes at any level of the hierarchy (file, move, or track). This allows, for example, the same metadata to be presented in two different, alternative, meta-data systems. The meta box relation box ("mere") enables describing how different meta boxes relate to each other (e.g., whether they contain exactly the same metadata, but described with different schemes, or if one represents a superset of another).

Figure 3A:
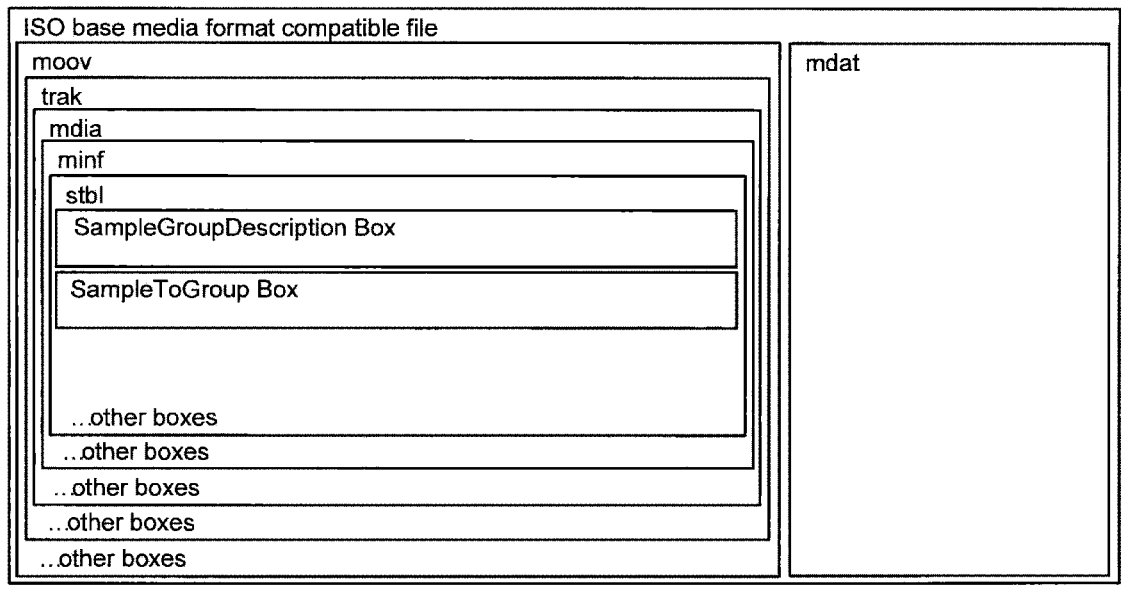
FIG. 3A is an exemplary box illustrating sample grouping.
Figure 3B:
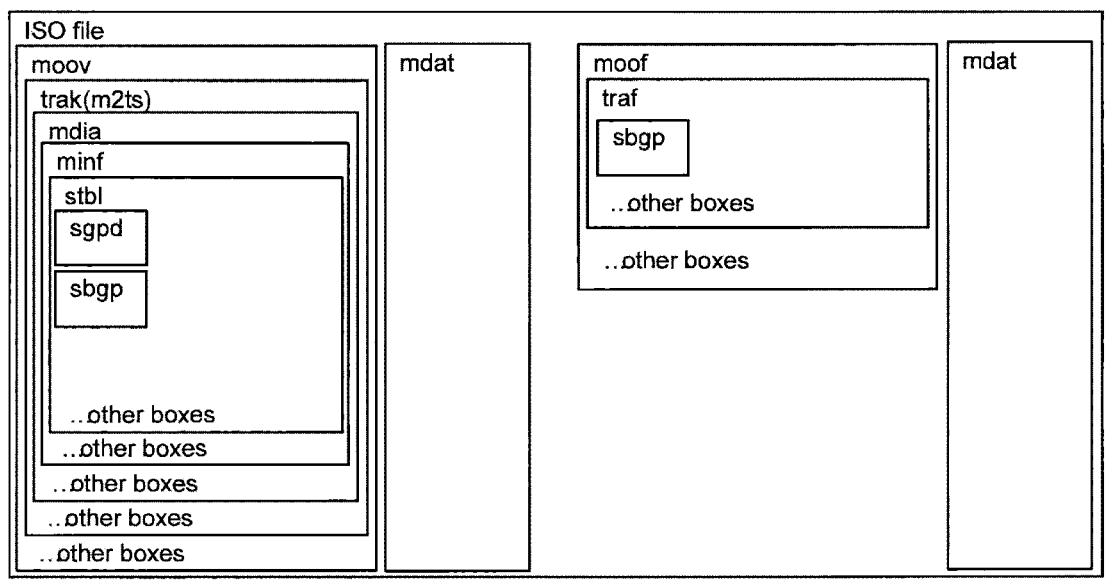
FIG. 3B illustrates an exemplary box containing a movie fragment including a SampletoToGroup box.
Figure 4:
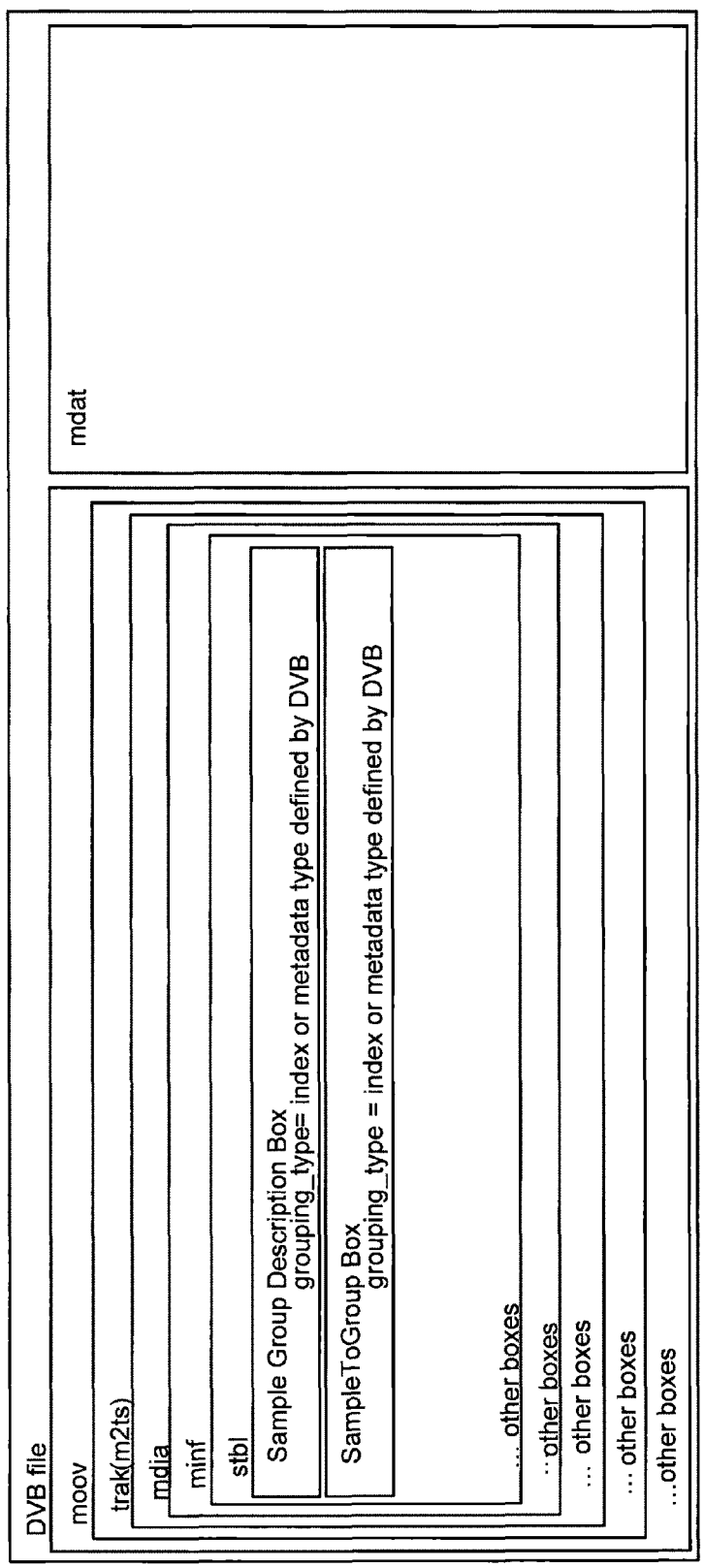
FIG. 4 illustrates an exemplary box with segmented metadata according to grouping type according to an embodiment of the present invention.

Referring now to FIGS. 3A, 3B and 4, the use of sample grouping in boxes is illustrated. A sample grouping in the ISO base media file format and its derivatives, such as the AVC file format and the SVC file format, is an assignment of each sample in a track to be a member of one sample group, based on a grouping criterion. A sample group in a sample grouping is not limited to being contiguous samples and may contain non-adjacent samples. As there may be more than one sample grouping for the samples in a track, each sample grouping has a type field to indicate the type of grouping. Sample groupings are represented by two linked data structures: (1) a SampleToGroup box (sbgp box) represents the assignment of samples to sample groups; and (2) a SampleGroupDescription box (sgpd box) contains a sample group entry for each sample group describing the properties of the group. There may be multiple instances of the SampleToGroup and SampleGroupDescription boxes based on different grouping criteria. These are distinguished by a type field used to indicate the type of grouping, as illustrated in FIG. 4.

FIG. 3A provides a simplified box hierarchy indicating the nesting structure for the sample group boxes. The sample group boxes (SampleGroupDescription Box and SampleToGroup Box) reside within the sample table (stbl) box, which is enclosed in the media information (minf), media (mdia), and track (trak) boxes (in that order) within a movie (moov) box.

The SampleToGroup box is allowed to reside in a movie fragment. Hence, sample grouping can be done fragment by fragment. FIG. 3B illustrates an example of a file containing a movie fragment including a SampleToGroup box. As illustrated in FIG. 4, the SampleGroupDescription Box and SampleToGroup Box may identify a grouping_type based on an index or metadata type.

A key feature of the DVB file format is known as reception hint tracks, which may be used when one or more packet streams of data are recorded according to the DVB file format. Reception hint tracks indicate the order, reception timing, and contents of the received packets among other things. Players for the DVB file format may re-create the packet stream that was received based on the reception hint tracks and process the re-created packet stream as if it was newly received. Reception hint tracks have an identical structure compared to hint tracks for servers, as specified in the ISO base media file format. For example, reception hint tracks may be linked to the elementary stream tracks (i.e., media tracks) they carry, by track references of type 'hint'. Each protocol for conveying media streams has its own reception hint sample format.

Servers using reception hint tracks as hints for sending of the received streams should handle the potential degradations of the received streams, such as transmission delay jitter and packet losses, gracefully and ensure that the constraints of the protocols and contained data formats are obeyed regardless of the potential degradations of the received streams.

The sample formats of reception hint tracks may enable constructing of packets by pulling data out of other tracks by reference. These other tracks may be hint tracks or media tracks. The exact form of these pointers is defined by the sample format for the protocol, but in general they consist of four pieces of information: a track reference index, a sample number, an offset, and a length. Some of these may be implicit for a particular protocol. These 'pointers' always point to the actual source of the data. If a hint track is built 'on top' of another hint track, then the second hint track must have direct references to the media track(s) used by the first where data from those media tracks is placed in the stream.

Conversion of received streams to media tracks allows existing players compliant with the ISO base media file format process DVB files as long as the media formats are also supported. However, most media coding standards only specify the decoding of error-free streams, and consequently it should be ensured that the content in media tracks can be correctly decoded. Players for the DVB file format may utilize reception hint tracks for handling of degradations caused by the transmission, i.e., content that may not be correctly decoded is located only within reception hint tracks. The need for having a duplicate of the correct media samples in both a media track and a reception hint track can be avoided by including data from the media track by reference into the reception hint track.

Currently, three types of reception hint tracks are being specified: MPEG-2 transport stream (MPEG2-TS), Real-Time Transport Protocol (RTP), and Real-Time Transport Control Protocol (RTCP) reception hint tracks. Samples of an MPEG2-TS reception hint track contain MPEG2-TS packets or instructions to compose MPEG2-TS packets from references to media tracks. An MPEG-2 transport stream is a multiplex of audio and video program elementary streams and some metadata information. It may also contain several audiovisual programs. An RTP reception hint track represents one RTP stream, typically a single media type. An RTCP reception hint track may be associated with an RTP reception hint track and represents the RTCP packets received for the associated RTP stream.

RTP is used for transmitting continuous media data, such as coded audio and video streams in networks based on the Internet Protocol (IP). The Real-time Transport Control Protocol (RTCP) is a companion of RTP, i.e. RTCP should be used to complement RTP always when the network and application infrastructure allow. RTP and RTCP are usually conveyed over the User Datagram Protocol (UDP), which, in turn, is conveyed over the Internet Protocol (IP). There are two versions of IP, IPv4 and IPv6, differing by the number of addressable endpoints among other things. RTCP is used to monitor the quality of service provided by the network and to convey information about the participants in an on-going session. RTP and RTCP are designed for sessions that range from one-to-one communication to large multicast groups of thousands of endpoints. In order to control the total bitrate caused by RTCP packets in a multiparty session, the transmission interval of RTCP packets transmitted by a single endpoint is proportional to the number of participants in the session. Each media coding format has a specific RTP payload format, which specifies how media data is structured in the payload of an RTP packet.

The metadata requirements for the DVB file format can be classified to four groups based on the type of the metadata: 1) sample-specific timing metadata, such as presentation timestamps; 2) indexes; 3) segmented metadata; and 4) user bookmarks (e.g., of favorite locations in the content).

For sample-specific timing metadata, there can be different timelines to indicate sample-specific timing metadata. Timelines may be required to cover the entire length of the recorded streams. Further, timelines may be paused. For example, timeline A may be created in the final editing phase of a movie. A service provider or another entity may insert commercials and provided timeline B for the commercials. Timeline A may be paused while commercials are ongoing. Timelines may also be transmitted after the content itself. In one embodiment, a timeline samples may be carried within MPEG-2 program elementary streams (PES). A PES conveys an elementary audio or video bitstream, and hence, timelines are accurately synchronized with audio and video frames. In this regard, reference is made to ETSI TS 102 823, "Specification for the carriage of synchronized auxiliary data", which is hereby incorporated by reference.

Indexes may include, for example, video access points and trick mode support (e.g., fast forward/backward, slow-motion). Such operations may require, for example, indication of self-decodable pictures, decoding start points, and indications of reference and non-reference pictures.

In the case of segmented metadata, the DVB services may be described with a service guide according to a specific metadata schema, such as Broadcast Content Guide (BCG), TV-Anytime, or Electronic Service Guide (ESG) for IP datacasting (IPDC). The description may apply to a part of the stream only. Hence, the file may have several descriptive segments (e.g., a description about that specific segment of the program, such as "Holiday in Corsica near Cargese") information.

In addition, the metadata and indexing structures of the DVB file format are required to be extensible and user-defined indexes are required to be supported. Additionally, there should be a method for fast access to elements in the file (e.g., via index tables). Furthermore, it should be possible to signal the accuracy of any index. For example, the index might be perfectly accurate, accurate to ±a specified amount or a heuristic guess only.

Various techniques for performing indexing and implementing segmented metadata have been proposed. Such techniques include, for example, sample events and sample properties. The sample event mechanism enables the listing of samples associated with a particular event type and event description index in one data structure, referred to as the SampleToEvent box. Each entry in the list may be additionally accompanied by a value or description, having a determined size in terms of bytes. Samples are listed with reference to their sample number within the associated track. It is not required to have all samples listed for a particular event type. The allowed values of the event type are predetermined and specified, e.g., in the DVB File Format specification. For each used event type in any SampleToEvent box, there is a respective SampleEventDescription box associated with the same event type. A SampleEventDescription box contains a list of sample event description entries, each associated with a unique event description index (staring from 1 and incremented by 1 per each entry in the list). The syntax and semantics of sample event description entries are determined by the event type and are specified e.g. in the DVB File Format specification. The semantics specified for a particular sample description index and event type apply to those samples that are associated with that sample description index and event type in SampleToEvent boxes. The SampleToEvent box is allowed to reside in a movie fragment. Hence, a listing of sample events can be performed fragment by fragment. There may be multiple instances of the SampleToEvent and SampleEventDescription boxes for different event types, but there can be at most one SampleToEvent box of a particular event type per a movie fragment and at most one SampleEventDescription box of a particular event type within a file.

Syntax of the SampleToEvent box and the SampleEventDescription box is specified as follows:

```
aligned(8) class SampleToEventBox extends FullBox(„steb") {
  unsigned int(32) event_type;
  unsigned int(32) entry_count;
  for(i=1; i<=entry_count; i++) {
    unsigned int(32) event_desc_index;
    unsigned int(32) sample_count;
    for(j=1; j<=sample_count; j++) {
      unsigned int(32) sample_number;
      unsigned int(8) value[event_data_length];
    }
  }
}
aligned(8) class SampleEventDescriptionBox extends FullBox(„sedb") {
  unsigned int(32) event_type;
  unsigned int(32) entry_count;
  for(i=1; i<=entry_count; i++) {
    SampleEventDescriptionEntry( );
  }
}
```

Semantics of the syntax elements used in the SampleToEvent box and the SampleEventDescription box are specified as follows:

event_type is a 32-bit unsigned integer which shall contain the four-character code of an event type, built of ASCII characters.

entry_count is a 32-bit unsigned integer with the number of entries in the following loop.

event_desc_index is a 32-bit unsigned integer with the index of the SampleEventDescriptionEntry.

sample_count is a 32-bit unsigned integer with the number of entries in the following loop which contains the sample numbers of the samples the event applies to.

value is an array of event-specific data. The length of this field is specified by event_data_length in the corresponding SampleEventDescriptionEntry. This field is constant size for all indexes in this loop and padding shall be applied for variable-length indexes.

In unicast, multicast, and broadcast streaming applications the available streams are announced and their coding formats are characterized to enable each receiver to conclude if it can decode and render the content successfully. Sometimes a number of different format options for the same content are provided, from which each receiver can choose the most suitable one for its capabilities and/or end-user wishes. The available media streams are often described with the corresponding media type and its parameters that are included in a session description formatted according to the Session Description Protocol (SDP). In unicast streaming applications the session description is usually carried by the Real-Time Streaming Protocol (RTSP), which is used to set up and control the streaming session. In broadcast and multicast streaming applications, the session description may be carried as part of the electronic service guide (ESG) for the service. The SDP information for a broadcast stream may be updated during the broadcast. Hence, SDP for a recorded stream should be stored in such a manner that it can be updated later.

Figure 5A:
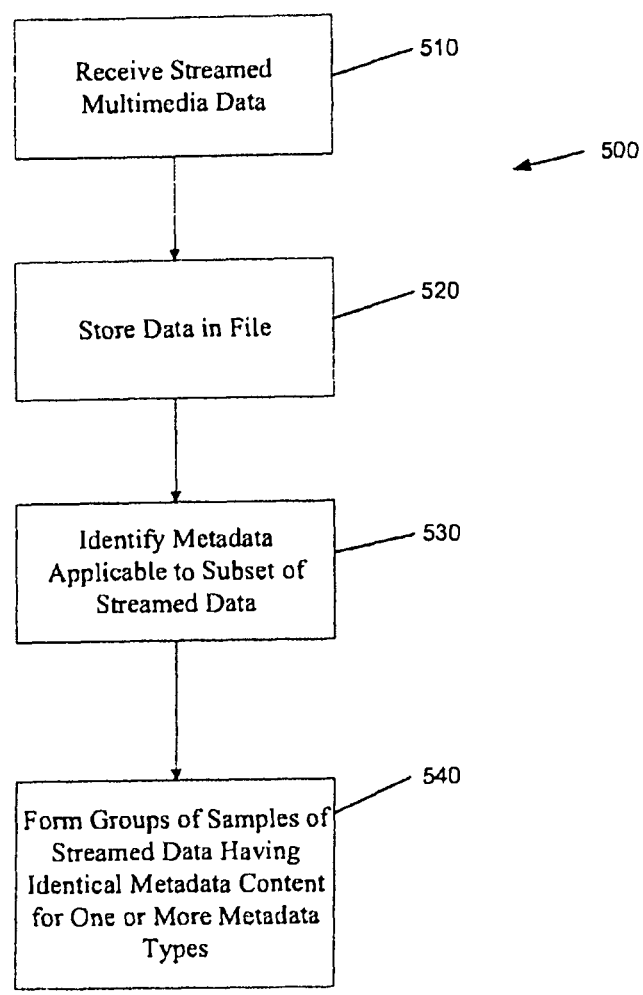
FIG. 5A is a flowchart illustrating an exemplary method of organizing streamed data according to an embodiment of the present invention.

Referring now to FIG. 5A, a method 500 according to an embodiment of the invention by which streamed data is advantageously stored and organized is illustrated. According to an embodiment of the invention, streamed media is received at, for example, a receiving unit or another device (block 510). The streamed data, which may be at least one media or multimedia stream, is stored in a file (block 520). In terms of the ISO base media file format, the at least one received media or multimedia stream may be stored in a reception hint track in a file. Metadata which is applicable to a subset of the streamed data is identified (block 530). For example, metadata applicable to certain samples of the reception hint track may be identified. Groups of samples of the streamed data having identical metadata content of a certain metadata type are formed and identified in a file (block 540). In this regard, sample grouping based on a certain metadata type may be indicated with the sample group description box, and samples can be mapped to certain metadata content included in the sample group description box with the sample-to-group box. In another embodiment, a certain metadata type is considered to comprise both the type indicating the syntax and semantics of the metadata content and a part of the metadata content that remains unchanged in the grouping. For example, the metadata type can indicate timeline metadata, and the part of the metadata remaining unchanged in the grouping can comprise an identifier of the timeline.

Figure 5B:
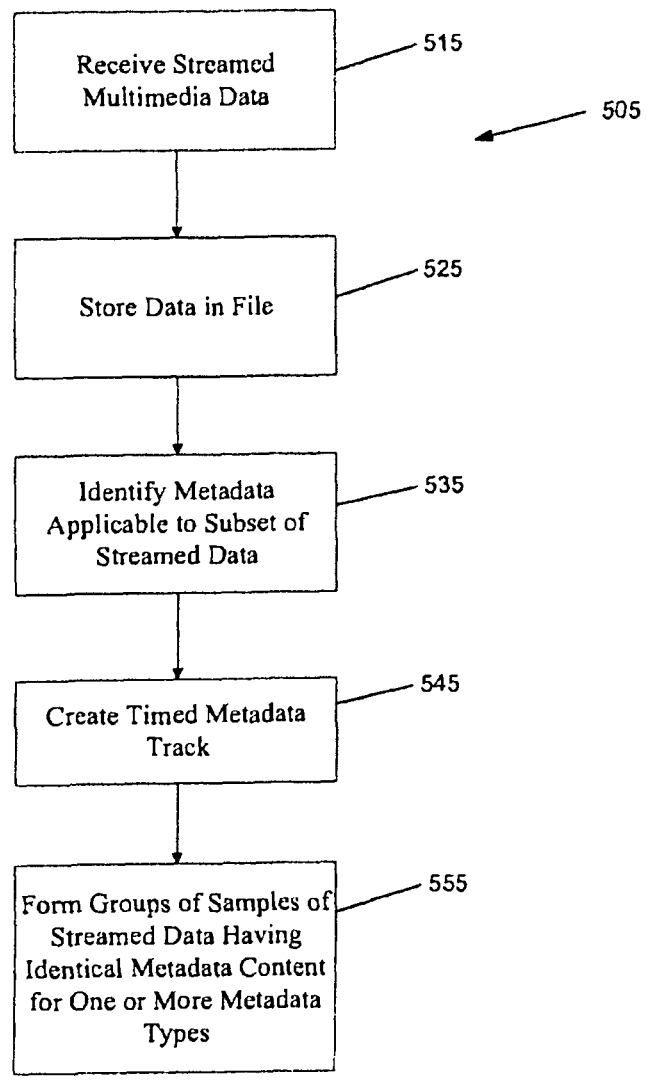
FIG. 5B is a flowchart illustrating an exemplary method of organizing streamed data according to another embodiment of the present invention.

Referring now to FIG. 5B, a method 505 according to another embodiment of the invention is illustrated. In the embodiment of FIG. 5B, streamed media is received at, for example, a receiving unit or another device (block 515). The streamed data, which may be at least one media or multimedia stream, is stored in a file and associated with a reception hint track in a file (block 525). At least one metadata sample applicable to a reception hint sample is identified (block 535). The at least one metadata sample is then stored in the file and associated with a timed metadata track (block 545). Groups of samples of the streamed data having identical metadata content of a certain metadata type are formed and identified in a file (block 555). Sample grouping based on a certain metadata type is indicated with the sample group description box, and metadata samples can be mapped to certain metadata content included in the sample group description box with the sample-to-group box. As above, a certain metadata type can also be considered to comprise both the type indicating the syntax and semantics of the metadata content and a part of the metadata content that remains unchanged in the grouping. It is noted that the sequential processing blocks suggested in FIG. 5B can be applied to different granularities of multimedia data and metadata, ranging from a subset of a sample to an entire stream. Different blocks can also apply to a different granularity of data. In one arrangement, blocks 515, 525, 535, 545 are iteratively applied to individual reception hint samples and metadata samples.

One grouping type is defined per metadata or index type in the DVB file format specification. Examples of potential grouping types include the following:

Any metadata specified by handler_type used for the meta box. Each sample group is associated with one item of the metadata scheme. The metadata scheme may be one of those specified in DVB specifications (BCG, TV-Anytime, IPDC ESG);

Any index type (e.g., those proposed in DVB document TM-FF0035, such as indication of self-decodable pictures, decoding start points, and indications of reference and non-reference pictures); and SDP information for received RTP streams.

Figure 6:
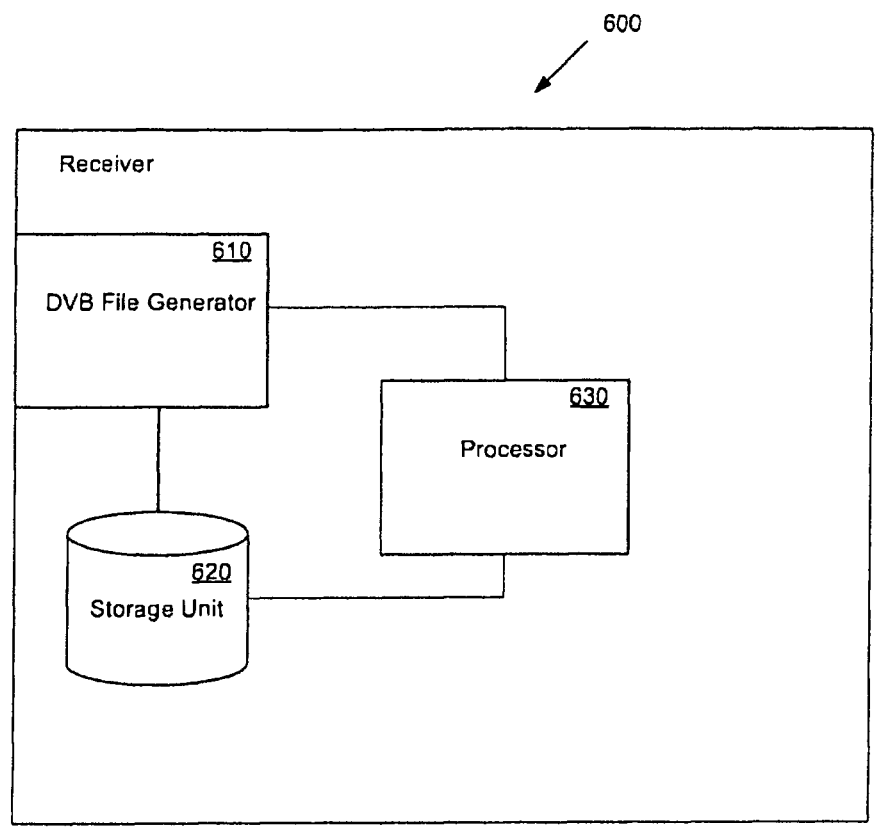
FIG. 6 is a block diagram of an exemplary device for receiving, storing and organizing streamed data according to an embodiment of the present invention.

Referring now to FIG. 6, an exemplary device according to an embodiment of the present invention is illustrated. The device 600, such as a receiver, is provided with a DVB file generator 610, a storage unit 620, and a processor 630. Of course, those skilled in the art will understand that the various components may be separated into further components or combined into fewer components. Further, the various components may include executable code for performing their functions. Upon receipt of streamed data, the DVB file generator 610 creates a DVB file from received packets. In this regard, the DVB file generator 610 receives the packet stream(s) themselves and associated metadata (such as BCG, TV-Anytime, or IPDC ESG). The device 600 stores the received packets to a file (in an mdat section of a file, if the moov and mdat boxes reside in the same file) as samples of a reception hint track in the storage unit 620. The receiver 600 may also derive file metadata that will be later stored within the moov box or the moof box, depending on whether or not movie fragments are in use. For any received piece of metadata, the receiver 600 (e.g., the processor 630) analyzes its type and creates a new sample group description box, if the type of metadata did not exist before. The receiver 600 also checks whether or not the content of the piece of metadata differs from all metadata stored earlier in the file. If the content is novel, then a new entry is created for the sample group description box and the metadata content is copied into the entry. The SampleToGroup box is maintained for each grouping type and samples of the reception hint track are mapped to one of the entries in the respective sample group description box.

In another embodiment, the DVB file generator 610 of the device 600 creates one or more reception hint tracks and file metadata for the moov box or the moof box. The device 600 also derives indexes, such as a randomly accessible intra picture indication, from received packets. This may be performed by the DVB file generator 610 or by another component of the device 600, such as the processor 630 or another component not shown in FIG. 6. If one or more indexes or pieces of metadata are derived or received for a received packet, the device 600 creates a timed metadata sample containing the indexes or the pieces of metadata. Again, this may be performed by a component of the device 600, such as the DVB file generator 610 or the processor 630. The timed metadata sample is associated with a timed metadata track, and the timed metadata track is associated with the reception hint track. For any received or derived piece of metadata or index, the processor 630 of the device 600 analyzes its type and creates a new sample group description box, if the type of metadata did not exist before. The processor 630 also checks whether or not the content of the piece of metadata differs from all metadata stored earlier in the file. If the content is novel, then a new entry is created for the sample group description box and the metadata content is copied into the entry. The SampleToGroup box is maintained for each grouping type and samples of the timed metadata track are mapped to one of the entries in the respective sample group description box.

In this embodiment, one metadata sample can be created for every reception hint sample, regardless of whether or not an index or a piece of metadata is associated with that reception hint sample. The payload of the corresponding metadata sample indicates if no index or piece of metadata is associated with a reception hint sample. Further, potential track fragments of a timed metadata track can be aligned to the corresponding reception hint track in terms of the first and last included sample in the fragments. It can be indicated within a file in a track-header-level box or structure whether or not there is one timed metadata sample per each reception hint sample, and whether or not track fragments of a timed metadata track are identical to those of the associated reception hint track. When one metadata sample is created per each reception hint sample, corresponding track fragments of a timed metadata track and a reception hint track may contain samples having identical sample numbers.

It is noted that the creation of sample grouping may be implemented in a number ways. For example, the creation of sample grouping may not happen simultaneously with the reception and storage of the samples themselves. Instead, sample grouping may be performed off-line, based on an intermediate format for storing metadata or based on the timed metadata track. Referring to FIG. 5A, blocks 530 and 540 would happen after the reception of the stream has been completed. Referring to FIG. 5B, block 555 would happen after the reception of the stream has been completed. Referring again to FIG. 1, the off-line creation of sample grouping would result into two additional blocks getting their input from the recording storage 155 and outputting to the decoder 160. The first block in processing order can be referred to as a file re-writer, which inputs a file without sample grouping for a particular metadata type and outputs a file with that type of sample grouping. The second block in processing order can be referred to as a second recording storage, which may have similar properties to the recording storage 155.

The file re-writer and the second recording storage referred to above may reside in the same device as the receiver 150, the recording storage 155, the decoder 160, or a different device. Moreover, the file re-writer and the second recording storage may reside in the same device or different devices from each other.

Received streams can be of different nature—they may contain several media types and programs in a multiplexed format (MPEG-2 transport streams) or they may contain a single media type of a single program (RTP streams). Consequently, the receiver operation and file format structures are adapted accordingly as follows.

It should be noted that the various embodiments of the present invention are not limited to any particular type of sample grouping, such as the sample grouping specified in ISO/IEC 14496-12. The following embodiment describes a sample grouping mechanism that can be applied with various embodiments of the invention.

In addition to the grouping type, a sample grouping may be characterized by zero or more global parameters. Examples of global parameters include a program identifier (PID) within an MPEG-2 transport stream and a timeline identifier. When parsing sample groups, only a particular value of the global parameter is of interest at a time, e.g., a desired timestamp within a particular timeline. In addition to enumerated sample group description entries, it can advantageous to allow local parameters that may change for each entry in the SampleToGroup box. For example, a timecode can be associated with an entry in the SampleToGroup box. When parsing a sample grouping, different values of local parameters are interleaved into the same structure, i.e. in the same SampleToGroup box.

Syntax of a sample grouping mechanism of this embodiment is presented below.

```
aligned(8) class DVBSampleToGroupBox
extends FullBox('dstg', version = 0, flags)
{
        unsigned int(32) grouping_type;
        if (flags & 1) {
                unsigned int(8) info_length;
                unsigned int(8) instance_info[info_length];
        }
        if (flags & 16) {
                unsigned int(8) static_length;
                unsigned int(8) static_info[static_length];
        }
        if (flags & 2)
                unsigned int(8) payload_length;
        unsigned int(32) entry_count;
        for (i=1; i <= entry_count; i++) {
                if (flags & 4)
                        unsigned int(32) sample_number;
                if (!(flags & 8))
                        unsigned int(32) sample_count;
                if (flags & 2)
                        unsigned int(8) payload[payload_length];
                else
                        unsigned int(32) group_description_index;
        }
}
```

The presented DVBSampleToGroup box is structurally compatible with the SampleToGroup box, i.e., if flags (of the box header) are 0, then the syntax is identical to the SampleToGroup box. Global parameters as specified above are represented by grouping instance information (instance_info). static_info represents static values remaining unchanged for all grouped samples. The semantics of static_info depend on grouping_type. For example, static_info may be formatted according to the payload of the DVBIndexBox (presented subsequently), giving timing and sample number inaccuracy ranges. Local parameters are represented by payload or group_description_index. The DVBSampleToGroup box can be parsed without semantic knowledge of grouping_type thanks to info_length, static_length, and payload length. A file editor software program or device that is unaware of a particular grouping_type can edit the box (e.g. as response of removal or insertion of samples), even if it did not have knowledge about the semantics of a particular grouping_type. sample_number indicates the first sample for which the payload or group_description_index apply, and the persistence of the payload or group_description_index in terms of number of consecutive samples is indicated by sample_count. If sample_number is not present, then the first sample for which the payload or group_description_index apply is subsequent to the last sample for which the previous entry in the loop applied. Values of sample_count in a DVBSampleToGroup box is increasing in appearance order. A sample can be included only once in a DVBSampleToGroup box, i.e., the sum of previous values of sample_number and sample_count is less than the present value of sample_number. It is not required that each sample in a track is mapped in a DVBSampleToGroup box. The DVBSampleGroupDescription box and group_description_index can be used for enumerated indexes. The value of payload or group_description_index for those samples that are not mapped in a DVBSampleToGroup box is unspecified. The semantics of instance_info and payload are specified for each grouping_type.

An alternative definition for the syntax of the DVB-SampleToGroup box is presented below. A primary difference compared to the previous case is that varying-length payloads are enabled.

```
aligned(8) class DVBSampleToGroupBox
extends FullBox('dstg', version = 0, flags)
{
        unsigned int(32) grouping_type;
        if (flags & 1) {
                unsigned int(8) info_length;
                unsigned int(8) instance_info[info_length];
        }
        if (flags & 16) {
                unsigned int(8) static_length;
                unsigned int(8) static_info[static_length];
        }
        if (flags & 2)
                unsigned int(8) payload_length;
                unsigned int(32) entry_count;
        for (i=1; i <= entry_count; i++) {
                if (flags & 4)
                        unsigned int(32) sample_number;
                if (!(flags & 8))
                        unsigned int(32) sample_count;
                if (flags & 2)
                        unsigned int(8) payload[payload_length];
                else if (flags & 32) {
                        unsigned int(8) varying_length;
                        unsigned int(8) payload[varying_length];
                }
                else
                        unsigned int(32) group_description_index;
        }
}
```

Figure 7:
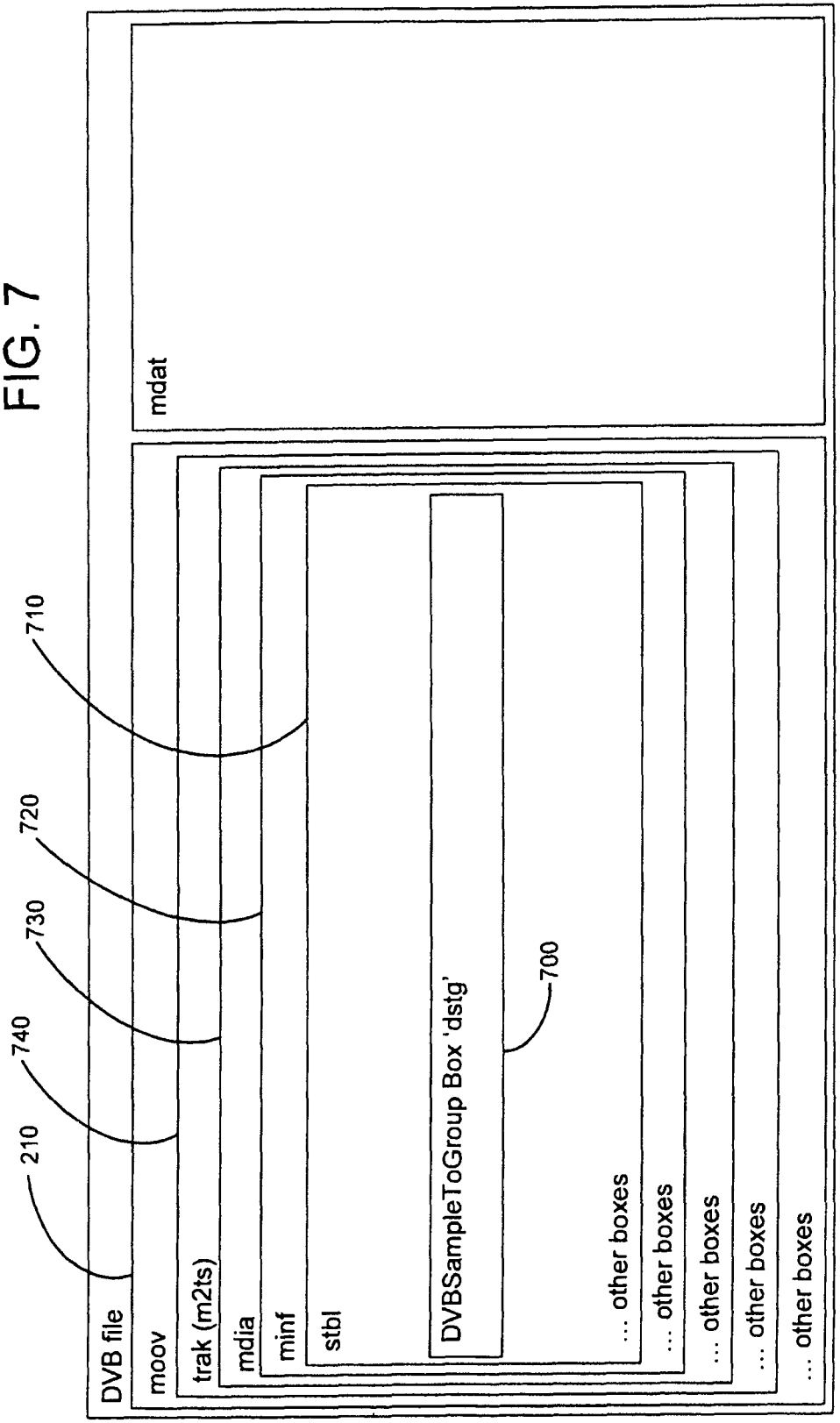
FIG. 7 is a representation of a simplified box hierarchy indicating the nesting structure for the DVBSampleToGroup box when group_description_index is not referred.

FIG. 7 provides a simplified box hierarchy indicating the nesting structure for the DVBSampleToGroup box 700 when group_description_index is not referred ((flags & 2) is equal to 1). DVBSampleToGroup boxes 700 reside within the sample table (stbl) box 710, which is enclosed in the media information (minf) 720, media (mdia) 730, and track (trak) boxes 740 (in that order) within a movie (moov) box 210.

Figure 8:
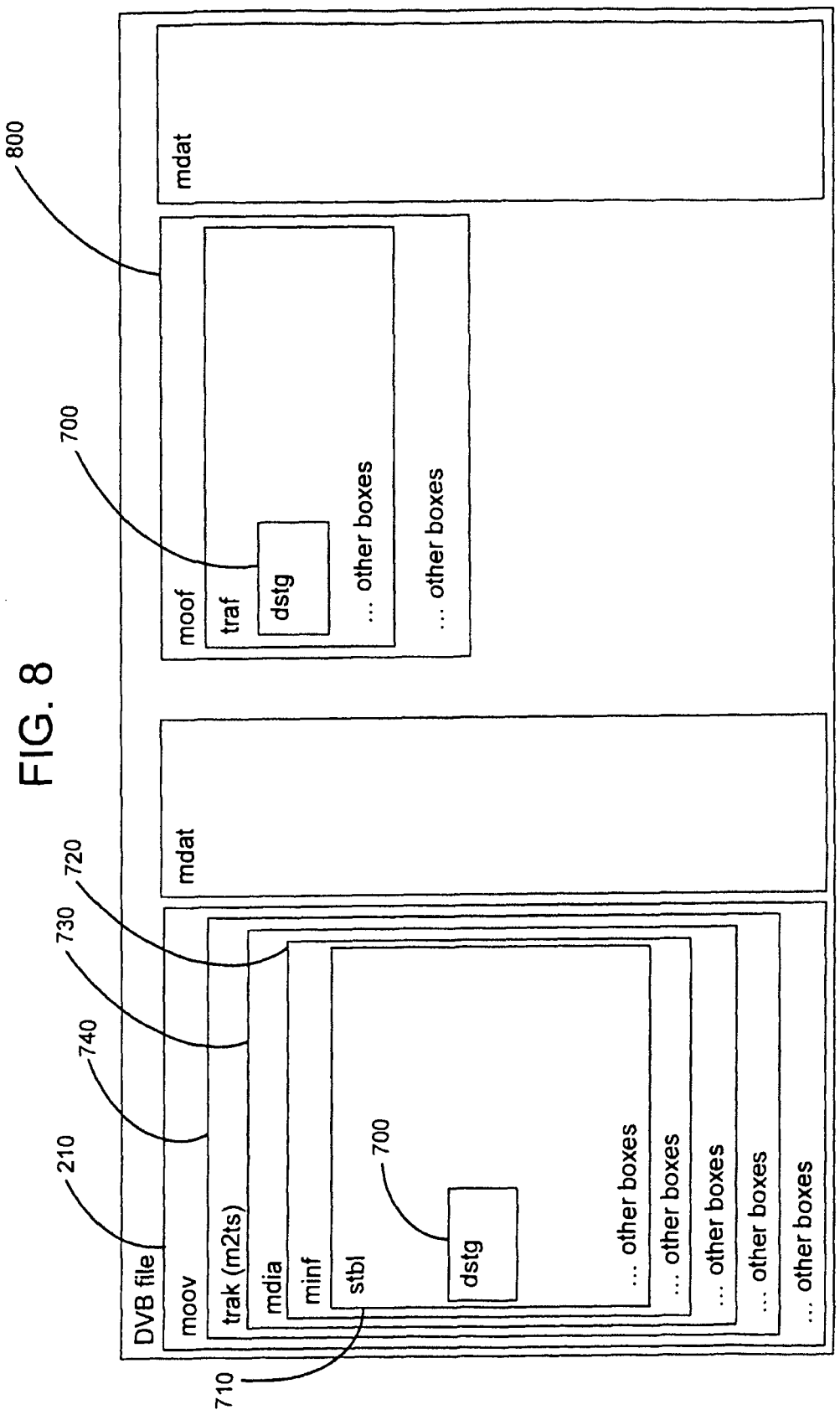
FIG. 8 is an illustration of an example file containing a movie fragment including a DVBSampleToGroup box.

The DVBSampleToGroup box 700 is allowed to reside in a movie fragment. Hence, sample grouping can be done fragment by fragment. FIG. 8 illustrates an example of a file containing a movie fragment 800 including a DVBSampleToGroup box 700.

Syntax of DVBSampleGroupDescription box is presented below.

```
aligned(8) class DVBSampleGroupDescriptionBox
(unsigned int(32) handler_type)
extends FullBox('dsgd', version, flags)
{
        unsigned int(32) grouping_type;
        if (flags & 1) {
                unsigned int(8) info_length;
                unsigned int(8) instance_info[info_length];
        }
        if (version>=1)
                unsigned int(32) default_length;
        unsigned int(32) entry_count;
        int i;
        for (i = 1; i <= entry_count ; i++){
                if (version>=1 && default_length==0)
                        unsigned int(32) description_length;
                switch (handler_type){
                        case 'vide': // for video tracks
                                VisualSampleGroupEntry ( );
                                break;
```

```
                        case 'soun': // for audio tracks
                                AudioSampleGroupEntry( );
                                break;
                        case 'hint': // for hint tracks
                                HintSampleGroupEntry( );
                                break;
                }
        }
}
```

The structure of the DVBSampleGroupDescription box is compatible with the SampleGroupDescription box, i.e., if flags (in the box header) are set to 0, the syntax is identical to the SampleGroupDescription box. Global parameters as defined above are represented by grouping instance information (instance_info). The inclusion of instance_info in the DVBSampleGroupDescription box enables different enumerations (i.e., sample group entries) for different values of the global parameters.

The syntax presented above for the DVBSampleToGroup box only allows a fixed-length payload or group_description_index being specified for each entry in the loop. It may be desirable for some grouping types to have varying-length payloads for any entry specified in a particular DVBSampleToGroup box. The following extension mechanism, referred to as DVBSampleToGroupExtension box is depicted below for this purpose.

```
aligned(8) class DVBSampleToGroupExtensionBox
extends FullBox('dsge', version = 0, flags)
{
        unsigned int(32) grouping_type;
        if (flags & 1) {
                unsigned int(8) info_length;
                unsigned int(8) instance_info[info_length];
        }
        if (flags & 2)
                unsigned int(32) extension_type;
        if (!(flags & 4))
                unsigned int(16) ext_length;
        unsigned int(32) entry_count;
        for (i=1; i<=entry_count; i++) {
                if (flags & 4)
                        unsigned int(16) ext_length;
                unsigned int(8) extension[ext_length];
        }
}
```

Each entry in the loop corresponds to the respective entry (having the same loop counter value) in the DVBSampleToGroup box having identical grouping_type and global parameter values (i.e., identical values of info_length and instance_info). In other words, extension applies to the same samples as payload when the loop counter value is the same in respective DVBSampleToGroupExtension and DVBSampleToGroup boxes. If extension_type is not present, then the default semantics for an extension of a grouping_type are applied. When extension_type is present, then it determines the semantics of extension. Similarly to the DVBSampleToGroup box, a DVBSampleToGroupExtension box of a particular global parameter and extension_type can be included for each movie fragment.

In addition to varying-length local parameters for sample groups, the DVBSampleGroupExtension box can be used for providing new pieces of information for a sample grouping while maintaining compatibility with existing sample group definitions and parsers. In other words, a parser not capable of interpreting the DVBSampleTo- GroupExtension box or a particular extension_type can still parse the corresponding DVBSampleToGroup box successfully.

In one embodiment, the instance_info used above in the syntax for DVB SampleToGroup, DVB SampleGroupDescription, and DVBSampleToGroupExtension boxes is an index to the loop included in the DVBGroupingInstance box having an identical value of grouping_type as the aforementioned boxes. The syntax of the DVBGroupingInstance box can be specified as follows. The semantics of instance_descr are determined by grouping_type.

```
aligned(8) class DVBGroupingInstanceBox
extends FullBox('dgri', version = 0, flags)
{
        unsigned int(32) grouping_type;
        unsigned int(32) default_length;
        unsigned int(32) entry_count;
        for (i=1; i<=entry_count; i++) {
                if (default_length == 0) {
                        unsigned int(32) descr_length;
                        unsigned int(8) instance_descr[descr_length];
                }
                else
                        unsigned int(8) instance_descr[default_length];
        }
}
```

In one embodiment, extension_type can be parameterized similarly to global and local parameters discussed previously. In other words, rather than identifying an extension based on its extension_type only, it can be associated with a parameter further specifying its intent and scope. The associated parameter can also be an index to a loop in another box, which contains the actual parameter values.

Figure 9:
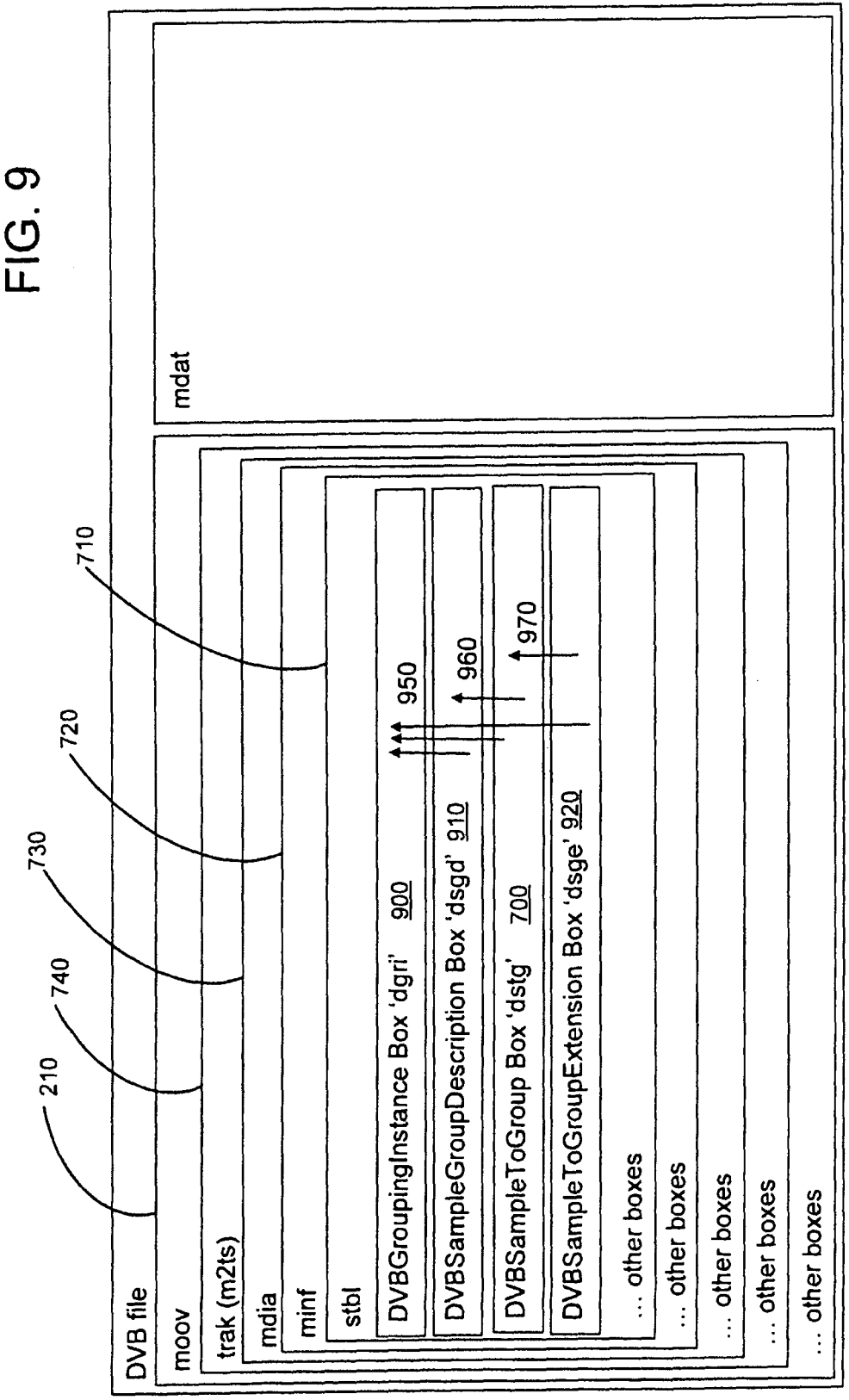
FIG. 9 is an illustration of a simplified box hierarchy indicating the nesting structure for the DVBGroupingInstance, DVBSampleGroupDescription, DVBSampleToGroup, and DVBSampleToGroupExtension boxes.

FIG. 9 provides a simplified box hierarchy indicating the nesting structure for the DVBGroupingInstance box 900, DVBSampleGroupDescription box 910, DVBSampleToGroup box 700, and DVBSampleToGroupExtension box 920. The above-identified boxes reside within the sample table (stbl) box 710, which is enclosed in the media information (minf) 720, media (mdia) 730, and track (trak) boxes 740 (in that order) within a movie (moov) box 210. Arrows 950, 960 and 970 indicate a logical connection. Arrows 950 indicate that DVBSampleGroupDescription box 910, DVBSampleToGroup box 700, and DVBSampleToGroupExtension box 920, if present, refer to the DVBGroupingInstance box 950 (with certain values of grouping_type). Arrow 960 indicates that with certain grouping_type and value of flags a DVBSampleToGroup box 700 refers to the respective DVBSampleGroupDescription box 910. Arrow 960 indicates that a DVBSampleToGroupExtension box 920 always refers to the respective DVBSampleToGroup box 700.

When sample grouping is applied to MPEG2-TS reception hint track (or any other multiplexed stream), the following holds:

Sample groups associated with the reception hint track are capable of representing metadata for the audio-video multiplex, e.g., toextual descriptive metadata;

Indices and metadata for a single media type can be represented by specific grouping types;

Approximate indices can be represented with specific grouping types.

Alternatively or complementarily, the accuracy of the indices can be indicated by including more than one contiguous sample into a sample group, which indicates that the indexed feature should be true in one of the contiguous samples. For example, an approximate random access point could be indicated by including N contiguous samples to a sample group of type random access point, indicating that one of the N samples should be a decoding start position.

When sample grouping is applied to a media track or RTP reception hint track, indices and metadata for a single media type can be represented by specific grouping types. However, as sample grouping mechanism operates only within one track, metadata that applies to more than one media track or reception hint track (later referred to as "multi-track" metadata) should be represented. This issue can materialize in two cases. First, both media tracks and reception hint track(s) may be created from the received stream. Second, there may be multiple RTP reception hint tracks. It is suggested that the sample grouping mechanism of the invention is associated with reception hint tracks whenever they are present in the file. Thus, the first case above can be avoided. For the second case, several options are contemplated.

First, "multi-track" metadata may be associated with any related track. When the metadata is associated to a reception hint track or a media track, the metadata implicitly applies to all reception hint tracks or media tracks, respectively, within the same period of decoding time. This alternative requires parsers to check all tracks for potential "multi-track" metadata.

Alternatively, "multi-track" metadata may be associated with a "master" track. The master track may be explicitly indicated with a new box within the moov box, for example. The new box may also list all the inter-linked tracks for the "multi-track" metadata.

In another embodiment, timed metadata track may be associated with many media tracks or RTP reception hint tracks. Sample grouping may be applied to the timed metadata track. The referred media and reception hint tracks may be listed as track references of type 'cdsc'. This serves as an explicit indication which tracks the metadata pertains to. If used, sample duration can be set to match the persistence of each metadata item.

In one embodiment of the present invention, in the embodiment of the "master" track described above, the new box is referred to as a track relation box and indicates relationship between tracks. The track relation box is defined as follows:

Box Type: 'trel'
Container: Movie Box ('moov')
Mandatory: No
Quantity: Zero or One The syntax for the track relation box is as follows:

```
aligned(8) class TrackRelationBox
        extends FullBox('trel', version = 0, flags) {
        int i,j;
        if(flags & 0x000001 == 1) {
                unsigned int(16) num_reception_groups;
                for(i=1; i<=num_reception_groups; i++) {
                        unsigned int(16) num_tracks_in_reception_group;
                        for(j=1; j<=num_tracks_in_reception_group; j++)
                                unsigned int(32) track_id;
                }
        }
}
```

In the above syntax, "version" is an integer that specifies the version of the track relation box (0 as described above), and "flags" is a 24-bit integer with flags. The following bits are defined, where bit 0 is the least significant bit, bit 1 is the second least significant bit, etc. When bit 0 is equal to 1, this indicates that information of reception groups is present in this box. When bit 0 is equal to 0, this indicates that information of reception groups is not present in this box. It is obvious for a person skilled in the art that other types of track relations could also be specified and indicated with a different bit number than bit 0.

"num_reception_groups" indicates the number of reception groups that are signaled. A reception group comprises reception hint tracks that are received simultaneously or are otherwise part of the same recording. In addition, a reception group may comprise media tracks that are derived based on reception hint tracks. "track_id" indicates the track identifier of the j-th track in the i-th reception group that is signaled. The first track_id of a reception group is a master track that may contain segmented metadata that is indicated with sample groups and is associated jointly with all the tracks in the reception group. No other track than a master track may be allowed to contain segmented metadata associated with all the tracks in the reception group.

When timed metadata tracks for indexes or segmented metadata are created, in one embodiment, the following practices may be followed.

One timed metadata track is created for program-specific indexes and metadata of a single-program MPEG-2 transport stream. Program-specific indexes and metadata apply equally to audio and video streams of a program and to any other potential components of the program, such as subtitle streams.

One timed metadata track per program is created for program-specific indexes and metadata of a multi-program MPEG-2 transport stream. In this regard, a timed metadata track may contain metadata of only one program. The program can be identified by its program_number value, which is a 16-bit unique identifier for programs within an MPEG-2 transport stream, used in program association and program map tables of an MPEG-2 transport stream, for example. In one embodiment, the parameter program_number can be included in the sample entry structure for timed metadata tracks associated with MPEG2-TS reception hint tracks.

One timed metadata track is created for media-specific indexes of each elementary stream of an MPEG2-TS program. Media-specific indexes may apply only to a particular media type. For example, they can be indications of reference and non-reference frames of video or indications of the temporal scalability level of video.

One timed metadata track may be created for media-specific indexes for an RTP stream. Further, one timed metadata track may be created for program-specific indexes of multiple RTP streams. The timed metadata track is associated with the RTP reception hint tracks using track references. In another embodiment, the timed metadata track is associated with the "master" reception hint track with a track reference and the other associated reception hint tracks are indicated through the TrackRelationBox as presented above.

Even though one program-specific timed metadata track and one media-specific timed metadata track per elementary media stream may often be preferable, more than one timed metadata tracks can be created. For example, if an alternative timeline for the program is provided subsequently to the program itself, it is more practical from the file arrangement point of view to create a new timed metadata track for the provided timeline.

For embodiments using timed metadata tracks, a receiver in accordance with an embodiment of the present invention can operate as follows as a response to each received packet:

Convert the received packet to a reception hint sample in the mdat box.

Derive indexes and segmented metadata. Write associated metadata sample(s), if any, to the mdat box (immediately after the corresponding reception hint sample).

Update boxes within the track header of the reception hint track.

Update boxes within the track header of the timed metadata track.

If the memory reserved for track header is about to be fully occupied (and cannot be dynamically re-allocated), start a new movie fragment.

A receiver with a greater amount of buffer memory may arrange several metadata samples and reception hint samples in continuous chunks of memory and, therefore, save in the storage space required for the sample to chunk box and the chunk offset box.

Indexes and segmented metadata have the following characteristics when it comes to reception hint samples that are associated with them. An index may indicate a characteristic to be valid from the associated reception hint sample onwards, usually until the next index of the same type. For example, an index may indicate a polarity change of scrambling in MPEG-2 transport stream. An index may indicate a characteristic of a single reception hint sample or an event that is synchronized with a reception hint sample. A bookmark is an example of such an index.

An index may indicate a characteristic of the stream in between the associated reception hint sample and the previous reception hint sample. An indication of missing packets is such an index.

An index may indicate a characteristic of a coded media sample. It is noted that timed metadata tracks proposed in this invention are associated to reception hint samples, reception hint samples do not usually contain exactly one media sample, and data for one media sample may or may not reside in contiguous reception hint samples (e.g., because elementary audio and video streams are multiplexed in an MPEG-2 transport stream). Consequently, there are at least two options how to index media samples: (1) an index is associated only with the first reception hint sample containing data for a media sample; and (2) an index is associated with all reception hint samples containing data for a media sample.

Sample groups associated with timed metadata tracks that contain indexes and segmented metadata can be created in any of the following ways:

A sample group can indicate the value of the index. For example, video sample characteristics can be indicated (random access intra picture, temporal level of the picture). In one embodiment, the sample group description box contains the allowed or used values for the index. In another embodiment, the payload or the extension fields included in a DVBSampleToGroup box or DVBSampleToGroupExtension box, respectively, can indicate the values of indexes.

A sample group can indicate whether or not the index of a particular type changed compared to the previous sample, i.e., the persistence of indexes. For example, changes of protection key for encrypted content can be indicated. In one embodiment, the DVBSampleToGroupExtension box can be used to contain the values of indexes when the sample to group box only contained an indication whether the index value changed.

A sample group can indicate bookmarks. The sample group description box contains the bookmarks themselves.

A sample group can indicate titles and other information for segmented metadata. The sample group description box contains the titles. One mechanism for linking structured metadata according to any particular metadata schema to sample groups is as follows. The metadata section formatted according to any particular metadata schema is included as an item in a meta box associated with the timed metadata track, the movie, or the whole file. Rather than including the metadata section as such in the sample group description box, the sample group description box contains links (typically as item identifiers) to the items containing the associated metadata section.

A sample group can indicate the value of a set (or tuple) of indexes or segmented metadata of any characteristic. For example, a sample group can indicate the value of a pair of indexes, such as temporal level in a hierarchical temporal scalability structure and picture type (intra, inter, or bi-predictive picture) for coded video elementary stream.

If an index is associated with a coded media sample, a sample group may indicate only the first reception hint sample containing data for the media sample or all reception hint samples containing data for the media sample.

Exemplary sample entry formats may be provided as follows:

```
abstract class IndexSampleEntry( ) extends MetadataSampleEntry
('ixse') {
    unsigned int(16) entry_count;
    for (i = 1; i <= entry_count; i++)
        unsigned int(32) index_type_4cc;
}
class MPEG2TSIndexSampleEntry( ) extends IndexSampleEntry
('m2ix') {
    unsigned int(16) program_number;
}
class MPEG2TSMediaIndexSampleEntry( ) extends
IndexSampleEntry ('m2mi') {
    unsigned int(3) reserved;
    unsigned int(13) pid;
}
class RTPIndexSampleEntry( ) extends IndexSampleEntry ('rtix') {
}
class RTPReceptionGroupIndexSampleEntry( ) extends
IndexSampleEntry ('rgix') {
}
```

"IndexSampleEntry" indicates the types of indexes that may be present in samples associated with this sample entry. If "entry_count" is equal to 0, any indexes may be included in samples associated with this sample entry. If "entry_count" is greater than 0, a loop of "index_type_4cc" values is given and each value of "index_type_4cc" indicates a four-character code for a box that may be present in samples associated with this sample entry. The sample entries for a timed metadata track therefore indicate the types of metadata that may occur in the timed metadata track. It is noted that other mechanisms to indicate the types of metadata present or allowed in a timed metadata track can be envisioned, e.g., as extensions of track header boxes.

"MPEG2TSIndexSampleEntry" is used for timed metadata tracks containing program-specific indexes and metadata and associated with an MPEG2-TS reception hint track. "program_number" identifies a program within the MPEG-2 transport stream.

"MPEG2TSMediaIndexSampleEntry" is used for timed metadata tracks containing media-specific indexes and metadata and associated with an elementary stream contained in an MPEG2-TS reception hint track. pid is an identifier for an elementary stream within an MPEG-2 transport stream.

"RTPIndexSampleEntry" is used for timed metadata tracks containing media-specific indexes and metadata and associated with an RTP reception hint track.

"RTPReceptionGroupIndexSampleEntry" is used for program-specific indexes and metadata and associated to more than one RTP reception hint track.

An exemplary sample format for a timed metadata track containing indexes and segmented metadata is provided below:

```
aligned(8) class IndexSample {
    box index_box[ ];
}
```

"IndexSample" contains zero or more index boxes. The four-character code for the included index boxes must be among those indicated by the associated sample entry.

Exemplary index boxes which can be used with the invention and which were originally proposed in DVB document TM-FF0058r0 are provided as follows:

```
abstract aligned(8) class DVBIndexBox (type) extends Box(type) {
    unsigned int(4)      time_accuracy;
    unsigned int(4)      sample_accuracy;
    if(time_accuracy >= 8)
        unsigned int(32)    max_timing_inaccuracy;
    if(sample_accuracy >= 8)
        unsigned int(32)    max_sample_accuracy;
}
```

The following values are specified for "time_accuracy" and "sample_accuracy": 0x0: accurate, 0x1: unspecified, 0x2: heuristic, 0x3: reserved (no maximum provided), 0x4-0x7: application-specific (no maximum provided), 0x8: maximum inaccuracy specified, 0x9: reserved (maximum inaccuracy provided), 0xA-0xF: application-specific (maximum inaccuracy provided).

```
aligned(8) class DVBVideoIndex extends DVBIndexBox('idvi') {
    unsigned int(8)     video_event_mask;
    unsigned int(24)    video_event_length;
};
```

"video_event_mask" is a bit mask indicating the video event(s) that start in the indicated sample, as per Table 1 below.

TABLE 1

Mask values used for "video_event_mask"

| Mask | Meaning |
|------|---------|
| 0x01 | video decode start point (e.g. a Random Access Point) |
| 0x02 | Self decodable picture (e.g. I frame) |
| 0x04 | Reference Picture |
| 0x08 | P Picture |
| 0x10 | B Picture |

"video_event length" is the number of samples (transport packets) that make up this video picture, including the current packet. The value '0' shall be used to mean "unknown". The Sync Sample Box can also carry the indexes to the events of type 0x01.

```
aligned(8) class DVBPCRIndex extends DVBIndexBox('idpi') {
    unsigned int(1)         PCR_discontinuity_flag;
    unsigned int(5)         reserved_0;
    unsigned int(42)        PCR_Value;
}
```

"PCR_discontinuity_flag" is a field that is set to '1' if there is a program clock reference (PCR) discontinuity in the associated PCR event; otherwise it is set to 0'.

"PCR_value" is the 27-MHz value extracted from the PCR that is indexed, for example, as per equation (2-1) in ISO/IEC International Standard 13818-1.

```
aligned(8) class DVBPolarityChange extends DVBIndexBox('idpc') {
    unsigned int(8)         polarity;
}
```

"polarity" is the polarity of the associated event, as per Table 2 below:

TABLE 2

Interpretation of Polarity values

| Value | Meaning |
|---|---|
| 0 | Clear |
| 1 | Odd polarity |
| 2 | Even polarity |

This value indicates the new polarity value which applies, and the timed metadata sample corresponds to the first reception hint sample with this new polarity. A polarity change index shall only be deemed to occur when the polarity of a stream of packets on a given PID changes, and not when it changes between packets of different PIDs.

```
aligned(8) class DVBCAIndex extends DVBIndexBox('idci') {
    unsigned int(8)   polarity;
    unsigned int(8)   ca_event_data[ ];
}
```

"ca_event_data" is the bytes that comprise the packet carrying the conditional access (CA) event; typically, this will be an ECM. The "ca_event_data" continues until the end of the box. The length of the "ca_event_data" can be determined from the length of the box.

```
aligned(8) class DVBTimecodeIndex extends DVBIndexBox('idtc') {
    unsigned int(8)         timeline_id;
    unsigned int(2)         reserved_0;
    unsigned int(6)         tick_format; // as per table 6 in
                                         TR 102 823
    unsigned int(32)        absolute_ticks;
}
```

"timeline_id" is the identifier of the timeline, as per ETSI TS 102 823, clause 5.2.2.4, and "tick_format" is a field which specifies the format that the "absolute_ticks" field takes, as per the Synchronized Auxiliary Data (SAD) specification, ETSI TS 102 823. "absolute_ticks" is the timecode, coded as indicated by the field "tick_format".

```
aligned(8) class DVBSectionUpdateIndex extends DVBIndexBox('idsu') {
    unsigned int(8)         table_id;
    unsigned int(16)        table_id_extension;
    unsigned int(8)         section_no;
    unsigned int(n*8)       section_data;       // optional
}
```

"DVBIDTable" box can be included, for example, in a sample table box for a timed metadata track. "table_id" is the table id of the section version update that is being indexed. "table_id_extension" (or "program_number" for PMT, or "transport_stream_id" for PAT) from the section version update is being indexed. "section no" is the section number to which this update applies. "section_data" is the field may not be present. If it is present it contains the section data of the new version. The section data shall continue until the end of the box. The length of the "section_data" can be determined from the length of the box.

```
aligned(8) class DVBIDIndex extends DVBIndexBox('didi') {
    unsigned int(5)         reserved;
    unsigned int(3)         running_status;     // As per table
                                                105 in 102 323
    unsigned int(24)        ID_Table_index;
}
```

"running_status" is the field which indicates the status of the ID that is referenced by the "ID_Table_index" field (e.g., if the ID is running or paused). The value of this field is define in table 105 of TS 102 323. "ID_Table_index" is an index into the "DVBIDTableBox", indicating the ID that applies at this location with the indicated running_status.

```
aligned(8) class DVBIDTable extends FullBox('didt', version = 0, 0) {
    unsigned int(32)        ID_count;
    for(i=0;i<ID_count;i++) {
        string              ID;         //in URI Format
    }
}
```

"ID_count" is the number of IDs that follow in the "DVBIDTable". "ID" is the URI formatted ID.

Further examples of index boxes are provided below:

```
aligned(8) class SDPUpdate extends DVBIndexBox('idsd') {
    string sdp_text;
}
```

"sdp_text" is a null-terminated string containing an SDP description that is valid starting from the indicated sample.

```
aligned(8) class KeyUpdate extends DVBIndexBox('idkm') {
    string key_message;
}
```

"key_message" contains the cryptographic key to be used for deciphering the packet payloads starting from the related reception hint sample.

```
aligned(8) class ErrorIndex extends DVBIndexBox('idei') {
    unsigned int(2) packet_header_error;
    unsigned int(2) packet_payload_error;
```

```
unsigned int(2) packet_sequence_gap;
unsigned int(2) reserved;
}
```

For "packet_header_error", a value 0x0 indicates that the packet header contains no errors. Value 0x1 indicates that the packet header may or may not contain errors. Value 0x2 indicates that the packet header contains errors. Value 0x3 is reserved.

For "packet_payload_error" a value 0x0 indicates that the packet payload contains no errors. Value 0x1 indicates that the packet payload may or may not contain errors. Value 0x2 indicates that the packet payload contains errors. Value 0x3 is reserved.

For "packet sequence_gap", a value 0x0 indicates that the packet immediately follows the previous packet in the reception hint track in transmission order. Value 0x1 indicates that the packet may or may not immediately follow the previous packet in the reception hint track in transmission order. Value 0x2 indicates that the packet does not immediately follow the previous packet in the reception hint track in transmission order, for example, that a there is at least one missing packet preceding this packet. Value 0x3 is reserved.

In another embodiment, an Index Sample Entry format for a timed metadata track containing indexes is as follows:

```
class IndexSampleEntry( ) extends MetadataSampleEntry ('ixse') {
    unsigned int(16) program_number;
    unsigned int(16) entry_count;
    int(32) sample_number_offset;
    for (i = 1; i <= entry_count; i++) {
        unsigned int(32) index_type_4cc;
        unsigned int(8) instance_info_length;
        unsigned int(8) payload_length;
        unsigned int(8) extension_count;
    }
}
```

An IndexSampleEntry indicates the types of indexes that may be present in samples associated with this sample entry. program_number identifies a program within the MPEG-2 transport stream. If entry_count is equal to 0, then any indexes may be included in samples associated with this sample entry, and default values (according to the first release of the DVB File Format specification) of instance_info_length, payload length, and extension_count are used. sample_number_offset specifies an offset to be added to the sample_number in the associated timed metadata samples to obtain the sample number in the referred track. index_type_4cc indicates an index type that may be present in samples associated with this sample entry. instance_info_length, payload length, and extension_count indicate the values of these fields used in index samples. A DVB File Format parser ignores those bytes index_instance_info, index_payload and index_extension that are beyond the byte range specified in this document for the respective index_type_4cc. This mechanism allows appending fields in a backward-compatible manner in later index format versions. If there are many timed metadata tracks for a reception hint track, then index_type_4cc values can be used to locate the track containing the desired indexes.

An index sample contains one or more index events, each having the following abstract syntax. The semantics of index_instance_info and index_payload are determined by the 32-bit index_type and the semantics of index_extension is determined by extension_type as specified subsequently. index_type corresponds to grouping_type in sample grouping.

```
abstract class IndexEvent(index_type, info_length, payload_length,
extension_count) {
    unsigned int(8) index_instance_info[info_length];
    unsigned int(8) index_payload[payload_length];
    for (i=1; i<=extension_count; i++) {
        unsigned int(32) extension_type;
        unsigned int(16) extension_length;
        unsigned int(8) index_extension[extension_length];
    }
    unsigned int(8) pad[ ];
}
abstract class IndexInstanceInfo(index_type, info_length)
{
}
abstract class IndexPayload(index_type, payload_length)
{
}
abstract class IndexExtension(extension_type, extension_length)
{
}
```

The semantics of index_instance_info, index_payload, extension_type, and index_extension in the IndexEvent structure are identical to the semantics of index_instance_info, index_payload, extension_type, and index_extension, respectively, used in DVBSampleToGroup, DVBSampleGroupDescription, and DVBSampleToGroupExtension boxes. This match enables the straightforward conversion between indexes included in timed metadata tracks and indexes indicated by DVBSampleToGroup boxes.

Syntax of some index events are provided below, where the semantics of the syntax elements is the same as described in the embodiment presented previously.

```
class VideoIndex extends IndexEvent("idvi", 0, 2, 0);
class VideoIndexPayload extends IndexPayload("idvi", 2) {
    unsigned int(2) reserved = 0;
    unsigned int(2) sample_depends_on;
    unsigned int(2) sample_is_depended_on;
    unsigned int(2) sequence_depends_on;
    unsigned int(8) dependency_level;
}
class PCRIndex extends IndexEvent("idpc", 0, 6, 0);
class PCRIndexPayload extends IndexPayload("idpc", 6) {
    unsigned int(1) PCR_discontinuity_flag;
    unsigned int(5) reserved_0;
    unsigned int(42) PCR_Value;
}
class PolarityIndex extends IndexEvent("idca", 2, 1, 1);
class PolarityInstanceInfo extends IndexInstanceInfo("idca", 2) {
    unsigned int(13) pid;
    unsigned int(3) reserved;
}
class PolarityIndex extends IndexEvent("idca", 0, 1, 1);
class PolarityIndexPayload extends IndexPayload("idca", 1) {
    unsigned int(6) reserved_0;
    unsigned int(2) polarity;
}
class PolarityIndexExtension extends IndexExtension("idca",
extension_length) {
    unsigned int(8) ca_event_data[extension_length];
}
class TimecodeIndex extends IndexEvent("idtc", 1, 5, 0);
class TimecodeIndexInstanceInfo extends IndexInstanceInfo("idtc", 1) {
    unsigned int(8) timeline_id;
}
```

```
class TimecodeIndexPayload extends IndexPayload("idtc", 5) {
    unsigned int(2) reserved_0;
    unsigned int(6) tick_format; // as per table 6 in TR 102 823
    unsigned int(32) absolute_ticks;
}
class TimeIndex extends IndexEvent("idti", 0, 0, 0);
class SectionUpdateIndex extends IndexEvent("idsu", 0, 4, 1);
class SectionUpdateIndexPayload extends IndexPayload("idsu", 4) {
    unsigned int(8) table_id;
    unsigned int(16) table_id_extension;
    unsigned int(8) section_no;
}
class SectionUpdateIndexExtension extends IndexExtension("idsu",
extension_length) {
    unsigned int(8) section_data[extension_length];
}
```

There are at least two types of usage for descriptive metadata. First, when a broadcast is recorded continuously (e.g., as a response of user initiating an instantaneous record operation rather than a scheduled recording of a particular program), content from more than one program may be recorded to a single file. Thus, Electronic Service Guide (ESG) information is also stored for more than one program within the file. An indexing mechanism can be used to map a group of samples comprising a program with the respective fragments of ESG information. Second, different "storylines", such as summaries or special cuts, can be provided by broadcasters. For example, a broadcaster can provide information, in particular the time periods and descriptions, about the goals of a soccer game, general highlights of the game, or highlights of a particular player during the game. These "storylines" can be provided after the recording and may use a specific timeline (as discussed in the timecode index presented earlier). An indexing mechanism can be used for indicating "storylines" in a recorded file.

The DVBSampleToGroup box can be used for descriptive or segmented metadata as follows. The value of grouping_type can be differentiate ESG and "storyline" metadata, even though they may be structurally identical and the same grouping_type could also be used. The global parameter, instance_info, is used to differentiate between storylines. For ESG metadata, instance_info can contain the item_id of the metadata item for initiating the ESG metadata (such as giving information about the ESG provider) or it may be used to differentiate between different programs of ESG metadata. In practice, instance_info can contain the item_id of a metadata item containing the information about storylines or ESG. Alternatively, instance_info may point to the DVBGroupingInstance box, which can e.g. contain a textual name of each storyline or URIs pointing to descriptions. The entries in the loop included in the DVBSampleToGroup box can be used as follows. If the constant-size payload field is used, it may contain the item_id of the metadata item containing a description of the grouped samples, such as respective ESG fragment or descriptive data about an event in the storyline. If group_description_index is used within the loop, the DVBSampleGroupDescription box may contain the URIs of the respective ESG fragments or descriptive XML fragments about an event in the storyline. Alternatively, the DVBSampleGroupDescription box may contain textual description of the storyline events. When the syntax for DVBSampleToGroup box that allows varying-length payloads is used, the payload can be an URI used for purposes mentioned above or a textual description of an event.

Figure 10:
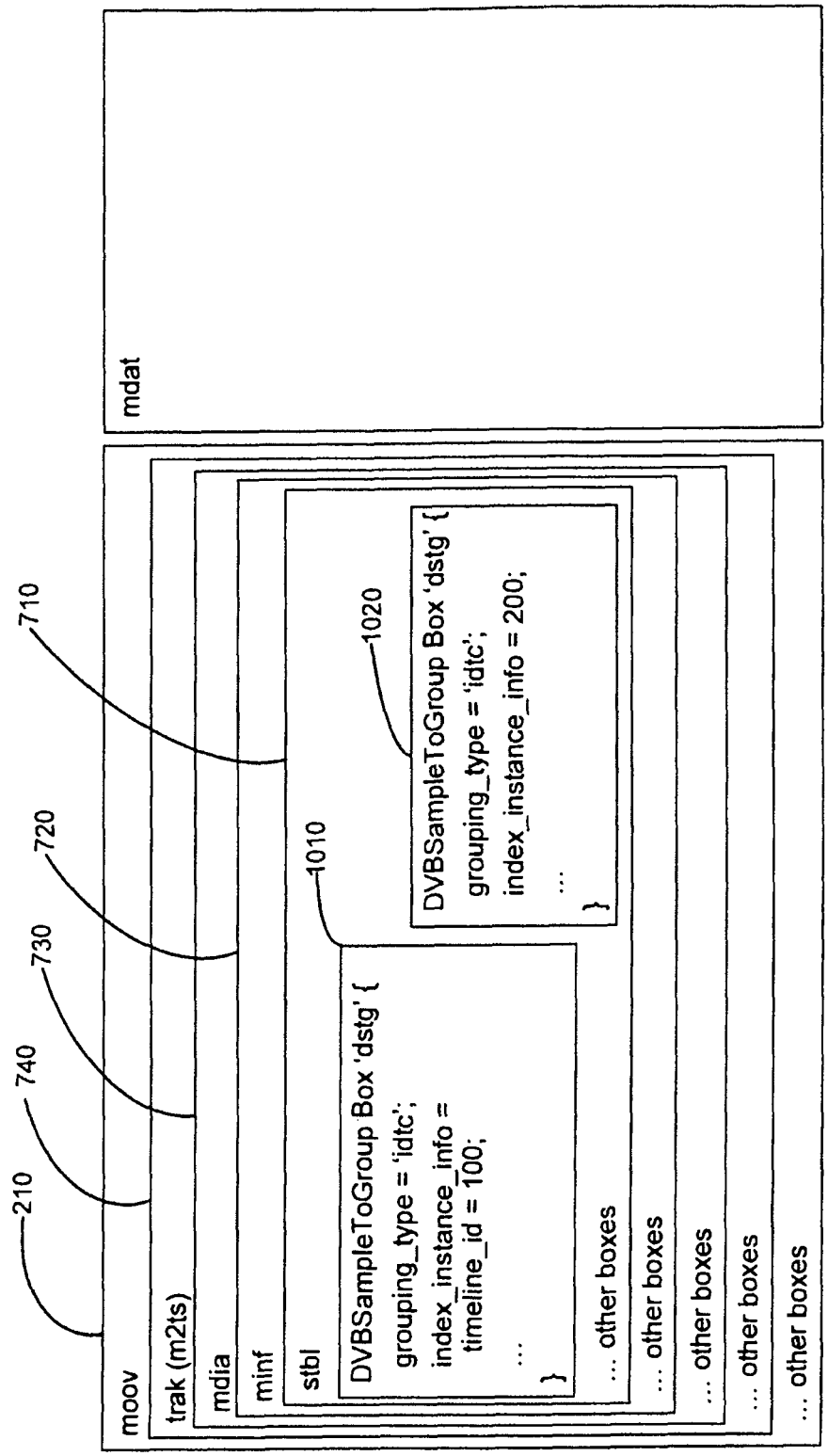
FIG. 10 is an illustration of a file including two sample groupings according to the DVBSampleToGroup box for the timecode index.

FIG. 10 illustrates a file including two sample groupings according to the DVBSampleToGroup box for the timecode index. As the syntax above specifies, the value of timeline_id serves as the global parameter for a timecode index sample grouping. In 1010, the timeline_id is equal to 100, whereas in 1020, the timeline_id is equal to 200.

When sample groups are included in a reception hint track or a media track, seeking to a position in a file based on a desired segmented metadata or index property can be done by a file parser with the following steps:
1. Select an appropriate sample group description box (based on its grouping type).
2. Select a desired group description index within the sample group description box.
3. Seek for the desired group description index from the SampleToGroup box(es) (of the selected grouping type). This reveals the sample number of the desired metadata/index property.
4. Use the sample table box to locate the sample in a file based on its sample number.

When sample groups according to the DVBSampleToGroup box are included in a reception hint track or a media track and payload rather than group_description_index is used, seeking a position in a file based on a desired segmented metadata or index property can be done by a file parser with the following processes:
1. Select an appropriate DVBSampleToGroup box (based on its grouping type and instance_info).
2. Seek for the desired value of payload in the DVBSampleToGroup box(es). This reveals the sample number having the desired metadata/index property.
3. Use the sample table box to locate the sample in a file based on its sample number.

When sample groups are included in a timed metadata track, seeking to a position in a file based on a desired segmented metadata or index property can be done by a file parser with the following processes:
1. Select an appropriate sample group description box (based on its grouping type).
2. Select a desired group description index within the sample group description box.
3. Seek for the desired group description index from the SampleToGroup box(es) (of the selected grouping type). This reveals the sample number of the desired metadata/index property within the timed metadata track.
4. Map the sample of the timed metadata track to a sample of the associated reception hint track. If one metadata sample is created for each reception hint sample, the desired sample number in the reception hint track is identical to that of the timed metadata track. Otherwise, derive the decoding timestamp of the timed metadata sample (using the decoding time to sample box) and seek for a reception hint sample having an identical decoding timestamp (or a reception hint sample that pertains at the time of the decoding timestamp)
5. Use the sample table box of the reception hint track to locate the sample in a file based on the sample number of the reception hint sample identified in the previous step.

When sample groups are included in a reception hint track or a media track, obtaining the indexes and segmented metadata valid for a particular reception hint sample or a media sample, respectively, can be done by a file parser with the following processes:
1. Select each sample to group box (one at a time) associated with the reception hint track or the media track and find the sample group description index of the of the particular reception hint sample or media sample, respectively.

2. Obtain the index or segmented metadata corresponding to the sample group description index from the respective sample group description box.

When sample groups are included in a timed metadata track, obtaining the indexes and segmented metadata valid for a particular reception hint sample can be done by a file parser with the following processes:

1. Map the reception hint sample to a metadata sample as follows. If one metadata sample is created for each reception hint sample, the desired sample number in the reception hint track is identical to that of the timed metadata track. Otherwise, derive the decoding timestamp of the reception hint sample (using the decoding time to sample box) and seek for a timed metadata sample having an identical decoding timestamp (or a timed metadata sample that pertains at the time of the decoding timestamp).

2. Select each sample to group box (one at a time) associated with the timed metadata track and find the sample group description index of the of the particular timed metadata sample, respectively.

3. Obtain the index or segmented metadata corresponding to the sample group description index from the respective sample group description box.

A player, typically comprising a file parser, a decoder 160, and a renderer 170, can provide a list of indices, bookmarks, or other types of metadata to the end-user by analyzing and re-producing some part of the content of the sample group description boxes.

A player may provide bookmarking operation to end-users. Bookmarks can be stored to a file using sample grouping similarly as described above for the receiver operation Thus, in accordance with embodiments of the present invention, sample groups can be used with movie fragments seamlessly, because SampleToGroup box can reside in a track fragment box. Hence, simultaneous recording and playback of a single file is fully supported. Further, the sample group mechanism is extensible, as new grouping types can be specified. Persistence of metadata is clear: contiguous samples with the same value of group_description_index (of the same grouping type). Further, getting a table of contents of the file based on SampleGroupDescription boxes is straightforward. Thus, when storing metadata associated with single samples, e.g. bookmarks, the sample grouping mechanism can be better than timed metadata tracks.

While embodiments of the invention have mostly concerned a receiver 150, a recording storage 155, a file parser, and a decoder 160, the presented file structures can also be used by an encoder 110 when creating a file. In particular, when a file is provided for playback without converting its media contents to a packetized format, it is often useful to provide segmented metadata and indices structured as proposed in the invention. In accordance with the ISO base media file format, the encoder 110 derives file metadata that will be later stored within the moov box or the moof box, depending on whether or not movie fragments are in use. For any received piece of metadata, the encoder 110 identifies its type and creates a new sample group description box, if the type of metadata did not exist before. The encoder 110 also checks whether or not the content of the piece of metadata differs from all metadata stored earlier in the file. If the content is novel, then a new entry is created for the sample group description box and the metadata content is copied into the entry. The SampleToGroup box is maintained for each grouping type and samples of a media track or a hint track are mapped to one of the entries in the respective sample group description box.

It is noted that the above-described creation of sample grouping may be implemented in a number ways. For example, the creation of sample grouping may not happen simultaneously with the encoding and storage 120 of the samples themselves. Instead, sample grouping may be performed off-line, based on an intermediate format for storing metadata. Referring again to FIG. 1, the off-line creation of sample grouping would result into two additional blocks getting their input from the storage 120 and outputting to the server 130. The first block in processing order can be referred to as a server file re-writer, which inputs a file without sample grouping for a particular metadata type and outputs a file with that type of sample grouping. The second block in processing order can be referred to as a second storage, which may have similar properties to the storage 120.

The server file re-writer and the second storage referred to above may reside in the same device as the encoder 110, the storage 120, the server 130, or a different device. Moreover, the server file re-writer and the second storage may reside in the same device or different devices from each other.

In one embodiment, the server 130 typically includes a file parser (not shown in FIG. 1). The file parser follows the instructions provided in one or more hint tracks to generate a packet stream from coded media bitstreams included in a container file. The file parser further processes the information given in the sample group description boxes associated with the hint tracks. The processing may include, for example, creation of SDP information or parts of an electronic service guide based on the information given in the sample group description boxes. The processing may also include processing of the SampleToGroup boxes to resolve the relation of pieces of metadata (associated with a certain group description index) given in the sample group description boxes with media or hint samples, and the persistence of metadata provided in the sample group description boxes. For example, the server may check when new SDP information is required for decoding of the transmitted packet stream and send the new SDP information such a way that it is available for a receiver when it is needed for decoding packets. In one embodiment, the file provided to the server is created by a receiver 150 and stored in a recording storage 155, which is operationally connected to the server 130.

While particular embodiments of the present invention have been disclosed, it is to be understood that various different modifications and combinations are possible and are contemplated within the true spirit and scope of the appended claims. There is no intention, therefore, of limitations to the exact abstract and disclosure herein presented.

Various embodiments of present invention described herein are described in the general context of method steps, which may be implemented in one embodiment by a program product including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps. Various embodiments of the present invention can be implemented directly in software using any common programming language, e.g. C/C++ or assembly language.

Software and web implementations of the present invention could be accomplished with standard programming techniques with rule based logic and other logic to accomplish the various database searching steps, correlation steps, comparison steps and decision steps. It should also be noted that the words "component" and "module," as used herein and in the claims, is intended to encompass implementations using one or more lines of software code, and/or hardware implementations, and/or equipment for receiving manual inputs.

Individual and specific structures described in the foregoing examples should be understood as constituting representative structure of means for performing specific functions described in the following the claims, although limitations in the claims should not be interpreted as constituting "means plus function" limitations in the event that the term "means" is not used therein. Additionally, the use of the term "step" in the foregoing description should not be used to construe any specific limitation in the claims as constituting a "step plus function" limitation. To the extent that individual references, including issued patents, patent applications, and non-patent publications, are described or otherwise mentioned herein, such references are not intended and should not be interpreted as limiting the scope of the following claims.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A method comprising:
  causing streamed data to be stored in a file, wherein the file consists of media data and metadata enclosed separately, wherein causing the streamed data to be stored in the file includes storing in a reception hint track;
  identifying metadata applicable to two or more samples of the streamed data;
  causing at least one timed metadata track to be created based on the identified metadata, the at least one timed metadata track describing a referred media track and the reception hint track, wherein the hint track refers to samples comprising instructions for constructing packets for transmission over an indicated communication protocol, wherein the media track refers to samples formatted according to a media compression format;
  forming at least one group from the two or more samples of the streamed data, each sample in a group having identical metadata content for a metadata type;
  selecting each sample to group box associated with the reception hint track and the media track; and
  finding a sample group description index of a particular reception hint sample or a media sample.

2. The method of claim 1, further comprising causing the at least one group to be identified in a file.

3. The method of claim 1, wherein the file is in accordance with International Organization for Standardization (ISO) base media file format.

4. The method of claim 3, wherein the metadata type is indicated by a grouping type and grouping instance data, the grouping type specifying semantics of the grouping instance data and the metadata content.

5. The method of claim 4, wherein the metadata content comprises a metadata payload and zero or more metadata payload extensions, wherein the metadata payload is included in a first structure, and wherein the zero or more metadata payload extensions are included in a second structure.

6. The method of claim 4, wherein the at least one group is indicated in a sample group description box.

7. The method of claim 3, wherein the at least one group is indicated in a sample group description box.

8. The method of claim 7, wherein the at least one group of one or more samples of the streamed data is indicated in a sample group description box for the timed metadata track through associating the at least one group of one or more samples of the streamed data with respective timed metadata samples in the timed metadata track.

9. The method of claim 1, wherein the metadata type includes titles of segments of the streamed data.

10. The method of claim 1, wherein a group includes samples from two or more tracks.

11. The method of claim 10, further comprising:
  identifying the group including samples from two or more tracks with metadata associated with all related tracks.

12. The method of claim 10, further comprising:
  identifying the group including samples from two or more tracks with metadata associated with a master track.

13. The method of claim 1, wherein timed metadata track associates timing metadata with one or more timelines.

14. The method of claim 13, wherein timed metadata track associates timing metadata with two or more timelines.

15. The method of claim 1, wherein causing the at least one timed metadata track to be created comprises causing at least two timed metadata tracks to be created.

16. The method of claim 15, wherein causing at least two timed metadata tracks to be created comprises causing a media-specific timed metadata track to be created and causing a program-specific metadata track to be created.

17. A computer program product comprising a non-transitory computer-readable medium storing program code portions therein, the program code portions being configured to, upon execution, cause an apparatus to at least:
  cause streamed data to be stored in a file, wherein the file consists of media data and metadata enclosed separately, wherein causing the streamed data to be stored in a file includes storing in a reception hint track;
  identifying metadata applicable to two or more samples of the streamed data;
  cause at least one timed metadata track to be created based on the identified metadata, the at least one timed metadata track describing a referred media track and the reception hint track, wherein the hint track refers to samples comprising instructions for constructing packets for transmission over an indicated communication protocol, wherein the media track refers to samples formatted according to a media compression format; and form at least one group from the two or more samples of the streamed data, each sample in a group having identical metadata content for a metadata type;

select each sample to group box associated with the reception hint track and the media track; and find a sample group description index of a particular reception hint sample or media sample.

18. The computer program product of claim 17, wherein the program code portions are further configured to, upon execution, cause the apparatus to cause the at least one group to be identified in a file.

19. The computer program product of claim 17, wherein the file is in accordance with International Organization for Standardization (ISO) base media file format.

20. The computer program product of claim 19, wherein the metadata type is indicated by a grouping type and grouping instance data, the grouping type specifying semantics of the grouping instance data and the metadata content.

21. The computer program product of claim 20, wherein the metadata content comprises a metadata payload and zero or more metadata payload extensions, wherein the metadata payload is included in a first structure, and wherein the zero or more metadata payload extensions are included in a second structure.

22. The computer program product of claim 19, wherein the at least one group is indicated in a sample group description box.

23. The computer program product of claim 22, wherein the at least one group of one or more samples of the streamed data is indicated in a sample group description box for the timed metadata track through associating the at least one group of one or more samples of the streamed data with respective timed metadata samples in the timed metadata track.

24. The computer program product of claim 17, wherein the metadata type includes titles of segments of the streamed data.

25. The computer program product of claim 17, wherein a group includes samples from two or more tracks.

26. The computer program product of claim 25, wherein the program code portions are further configured to, upon execution, cause the apparatus to:

identify the group including samples from two or more tracks with metadata associated with all related tracks.

27. The computer program product of claim 25, wherein the program code portions are further configured to, upon execution, cause the apparatus to:

identify the group including samples from two or more tracks with metadata associated with a master track.

28. The computer program product of claim 17, wherein timed metadata track associates timing metadata with one or more timelines.

29. The computer program product of claim 28, wherein timed metadata track associates timing metadata with two or more timelines.

30. The computer program product of claim 17, wherein the program code portions are further configured to, upon execution, cause the apparatus to cause the at least one timed metadata track to be created by causing at least two timed metadata tracks to be created.

31. The computer program product of claim 30, wherein the program code portions are further configured to, upon execution, cause the apparatus to cause the at least two timed metadata tracks to be created by causing a media-specific timed metadata track to be created and causing a program-specific metadata track to be created.

32. An apparatus comprising a processor and a memory storing program code, the memory and program code being configured to, with the processor, cause the apparatus to at least:

cause streamed data to be stored in a file, wherein the file consists of media data and metadata enclosed separately, wherein causing the streamed data to be stored in a file includes storing in a reception hint track;

identifying metadata applicable to two or more samples of the streamed data;

cause at least one timed metadata track to be created based on the identified metadata, the at least one timed metadata track describing a referred media track and the reception hint track, wherein the hint track refers to samples comprising instructions for constructing packets for transmission over an indicated communication protocol, wherein the media track refers to samples formatted according to a media compression format;

form at least one group from the two or more samples of the streamed data, each sample in a group having identical metadata content for a metadata type;

select each sample to group box associated with the reception hint track and the media track; and find a sample group description index of a particular reception hint sample or media sample.

33. The apparatus of claim 32, wherein the apparatus is further caused to identify the at least one group in a file stored in the memory.

34. The apparatus of claim 32, wherein the file is in accordance with International Organization for Standardization (ISO) base media file format.

35. The apparatus of claim 34, wherein the metadata type is indicated by a grouping type and grouping instance data, the grouping type specifying semantics of the grouping instance data and the metadata content.

36. The apparatus of claim 35, wherein the metadata content comprises a metadata payload and zero or more metadata payload extensions, wherein the metadata payload is included in a first structure, and wherein the zero or more metadata payload extensions are included in a second structure.

37. The apparatus of claim 34, wherein the at least one group is indicated in a sample group description box.

38. The apparatus of claim 37, wherein the at least one group of one or more samples of the streamed data is indicated in a sample group description box for the timed metadata track through associating the at least one group of one or more samples of the streamed data with respective timed metadata samples in the timed metadata track.

39. The apparatus of claim 32, wherein the metadata type includes titles of segments of the streamed data.

40. The apparatus of claim 32, wherein a group includes samples from two or more tracks.

41. The apparatus of claim 40, wherein the apparatus is further caused to identify the group including samples from two or more tracks with metadata associated with a master track.

42. The apparatus of claim 32, wherein the apparatus is further caused to identify the group including samples from two or more tracks with metadata associated with all related tracks.

43. The apparatus of claim 32, wherein timed metadata track associates timing metadata with one or more timelines.

44. The apparatus of claim 43, wherein timed metadata track associates timing metadata with two or more timelines.

45. The apparatus of claim 32, wherein the apparatus is caused to cause the at least one timed metadata track to be created by causing at least two timed metadata tracks to be created.

46. The apparatus of claim 45, wherein the apparatus is caused to cause at least two timed metadata tracks to be created by causing a media-specific timed metadata track to be created and causing a program-specific metadata track to be created.

47. An apparatus, comprising:
  means for causing streamed data to be stored in a file, wherein the file consists of media data and metadata enclosed separately, wherein causing the streamed data to be stored a file includes storing a reception hint track;
  means for identifying metadata applicable to two or more samples of the streamed data;
  means for causing at least one timed metadata track to be created based on the identified metadata, the at least one timed metadata track describing a referred media track and the reception hint track, wherein the hint track refers to samples comprising instructions for constructing packets for transmission over an indicated communication protocol, wherein the media track refers to samples formatted according to a media compression format;
  means for forming at least one group from the two or more samples of the streamed data, each sample in a group having identical metadata content for a metadata type;
  means for selecting each sample to group box associated with the reception hint track and the media track; and
  means for finding a sample group description index of a particular reception hint sample or media sample.

48. The apparatus of claim 47, wherein the file is in accordance with International Organization for Standardization (ISO) base media file format.

49. The apparatus of claim 48, wherein the metadata type is indicated by a grouping type and grouping instance data, the grouping type specifying semantics of the grouping instance data and the metadata content.

50. The apparatus of claim 49, wherein the metadata content comprises a metadata payload and zero or more metadata payload extensions, wherein the metadata payload is included in a first structure, and wherein the zero or more metadata payload extensions are included in a second structure.

51. The apparatus of claim 48, wherein the at least one group is indicated in a sample group description box.

* * * * *